(12) United States Patent
Zalah et al.

(10) Patent No.: US 12,548,356 B2
(45) Date of Patent: Feb. 10, 2026

(54) METHODS AND SYSTEMS FOR TRAINING A MODEL TO DIAGNOSE ABNORMALITTES IN TISSUE SAMPLES

(71) Applicant: Imagene AI LTD., Ramat Gan (IL)

(72) Inventors: Yehonatan Zalah, Ramat Gan (IL); Dean Bitan, Tel Aviv (IL); Shahar Porat, Tel Mond (IL)

(73) Assignee: Imagene AI LTD., Ramat Gan (IL)

( * ) Notice: Subject to any disclaimer, the term of this patent is extended or adjusted under 35 U.S.C. 154(b) by 325 days.

(21) Appl. No.: 18/252,324

(22) PCT Filed: Nov. 9, 2021

(86) PCT No.: PCT/IL2021/051327
§ 371 (c)(1),
(2) Date: May 9, 2023

(87) PCT Pub. No.: WO2022/101902
PCT Pub. Date: May 19, 2022

(65) Prior Publication Data
US 2023/0420133 A1 Dec. 28, 2023

Related U.S. Application Data

(60) Provisional application No. 63/112,191, filed on Nov. 11, 2020.

(51) Int. Cl.
*G06V 20/69* (2022.01)
*G06T 7/00* (2017.01)
(Continued)

(52) U.S. Cl.
CPC .......... *G06V 20/698* (2022.01); *G06T 7/0014* (2013.01); *G16B 20/20* (2019.02);
(Continued)

(58) Field of Classification Search
CPC ......... G06T 7/0014; G06T 2207/10056; G06T 2207/20021; G06T 2207/20081;
(Continued)

(56) References Cited

U.S. PATENT DOCUMENTS 6,754,380 B1  6/2004  Suzuki et al.
7,461,048 B2 * 12/2008 Teverovskiy .......... G16H 50/50
706/62
(Continued)

FOREIGN PATENT DOCUMENTS

CN          107886127 A  *  4/2018  .......... G06F 18/2411
WO   WO-2023213623 A1 * 11/2023  ............. G06V 10/82

OTHER PUBLICATIONS

International Search Report for Application No. PCT/IL2021/051327, mailed on Jan. 20, 2022, 3 pages.
(Continued)

*Primary Examiner* — John Villecco
(74) *Attorney, Agent, or Firm* — Dority & Manning, PA

(57) ABSTRACT

The present invention relates to artificial intelligence and machine learning methods and systems for diagnosing a disease, disorder or pathological condition. More particularly, the invention relates to methods and systems for training a machine learning model to diagnose a disease, disorder or pathological condition in a biopsy sample, to detect tissue abnormality in a biopsy sample, as well as to detect gene mutations expressed in the cells that are present in the biopsy sample.

27 Claims, 7 Drawing Sheets

(51) Int. Cl.
*G16B 20/20* (2019.01)
*G16B 40/20* (2019.01)
*G16H 50/20* (2018.01)

(52) U.S. Cl.
CPC ............. *G16B 40/20* (2019.02); *G16H 50/20* (2018.01); *G06T 2207/10056* (2013.01); *G06T 2207/20021* (2013.01); *G06T 2207/20081* (2013.01); *G06T 2207/20084* (2013.01); *G06T 2207/30024* (2013.01); *G06V 2201/03* (2022.01)

(58) Field of Classification Search
CPC . G06T 2207/20084; G06T 2207/30024; G06T 7/0012; G06T 2207/30096; G06V 2201/03; G06V 20/698; G06V 20/69; G16H 50/20; G16H 30/40; G16B 20/20; G16B 40/20
See application file for complete search history.

(56) References Cited

U.S. PATENT DOCUMENTS

| | | | | |
|---|---|---|---|---|
| 8,712,142 | B2 * | 4/2014 | Rajpoot | G06T 7/0012 |
| | | | | 435/6.14 |
| 10,650,520 | B1 * | 5/2020 | Beck | G06T 7/0012 |
| 10,943,345 | B2 * | 3/2021 | Barker | G06V 20/695 |
| 10,957,041 | B2 * | 3/2021 | Yip | G06N 3/084 |
| 11,176,676 | B2 * | 11/2021 | Rothrock | G06T 7/0012 |
| 11,195,274 | B2 * | 12/2021 | Veidman | G16H 10/40 |
| 11,276,172 | B2 * | 3/2022 | Hosseini | G06F 18/24323 |
| 11,348,240 | B2 * | 5/2022 | Yip | G06N 3/045 |
| 11,423,547 | B2 * | 8/2022 | Rothrock | G06V 10/28 |
| 11,449,985 | B2 * | 9/2022 | Stanitsas | G06T 17/10 |
| 11,475,566 | B2 * | 10/2022 | Kanan | G06T 7/11 |
| 11,482,335 | B2 * | 10/2022 | Jain | G16H 50/20 |
| 11,488,307 | B2 * | 11/2022 | Hosseini | G06T 7/0012 |
| 11,636,599 | B2 * | 4/2023 | Hosseini | G06T 7/0012 |
| | | | | 382/128 |
| 11,640,719 | B2 * | 5/2023 | Rothrock | G06V 10/26 |
| | | | | 382/128 |
| 11,682,192 | B2 * | 6/2023 | Chukka | G06V 10/774 |
| | | | | 382/128 |
| 11,727,674 | B2 * | 8/2023 | Bentaieb | G16H 50/30 |
| | | | | 382/128 |
| 11,741,604 | B2 * | 8/2023 | Kapur | G16H 50/20 |
| | | | | 382/128 |
| 11,972,870 | B2 * | 4/2024 | Jain | G16H 50/30 |
| 11,978,216 | B2 * | 5/2024 | Xu | G06T 5/60 |
| 11,995,903 | B2 * | 5/2024 | Rothrock | G06N 20/00 |
| 12,019,674 | B2 * | 6/2024 | Wang | G06N 3/04 |
| 12,033,743 | B2 * | 7/2024 | Hosseini | G06F 18/24323 |
| 12,266,096 | B2 * | 4/2025 | Kapur | G16H 10/40 |
| 2014/0233826 | A1 * | 8/2014 | Agaian | G06V 20/698 |
| | | | | 382/133 |
| 2017/0169276 | A1 * | 6/2017 | Agaian | G06T 5/20 |
| 2019/0286936 | A1 * | 9/2019 | Fuchs | G06V 10/763 |
| 2020/0066407 | A1 | 2/2020 | Stumpe et al. | |
| 2020/0349707 | A1 | 11/2020 | Hosseini et al. | |
| 2020/0388029 | A1 * | 12/2020 | Saltz | G06V 10/267 |
| 2021/0166380 | A1 * | 6/2021 | Yip | G06V 20/698 |
| 2022/0044762 | A1 * | 2/2022 | Van Der Baan | G16H 50/20 |
| 2022/0415004 | A1 * | 12/2022 | Netsch | G06T 7/74 |
| 2023/0162515 | A1 * | 5/2023 | Kozlowski | G06F 18/24133 |
| | | | | 382/133 |
| 2024/0028871 | A1 * | 1/2024 | Chiu | G06T 7/62 |
| 2024/0037747 | A1 * | 2/2024 | Raedt | G06V 20/70 |
| 2024/0087726 | A1 * | 3/2024 | Ocampo | G06T 7/0012 |
| 2024/0161276 | A1 * | 5/2024 | Jain | G06V 10/82 |
| 2024/0371520 | A1 * | 11/2024 | Vincent Salomon | |
| | | | | G06V 20/695 |
| 2024/0412354 | A1 * | 12/2024 | Rantalainen | G06T 7/0012 |
| 2024/0428939 | A1 * | 12/2024 | Verma | G16H 30/40 |
| 2025/0102509 | A1 * | 3/2025 | Khoury | G06V 20/695 |
| 2025/0125054 | A1 * | 4/2025 | Muhammad | A61B 5/4381 |

OTHER PUBLICATIONS

International Preliminary Report on Patentability for Application No. PCT/IL2021/051327, dated Feb. 15, 2023, 4 pages.

* cited by examiner

METHODS AND SYSTEMS FOR TRAINING A MODEL TO DIAGNOSE ABNORMALITIES IN TISSUE SAMPLES

CROSS REFERENCE TO RELATED APPLICATIONS

This application is a U.S. national phase of International Patent Application No. PCT/IL2021/051327, filed on Nov. 9, 2021, which, in turn, claims the benefit of priority to U.S. Provisional Patent Application No. 63/112,191, filed Nov. 11, 2020, the disclosures of both of which are hereby incorporated by reference herein in their entirety for all purposes.

FIELD OF THE INVENTION

The present invention relates to artificial intelligence and machine learning methods and systems for diagnosing abnormalities in tissue samples. More particularly, the invention relates to methods and systems for training a machine learning model to diagnose various diseases, disorders and pathological conditions in a biopsy sample, to detect abnormal cells or other abnormal tissue components in a biopsy sample, as well as to detect gene mutations expressed in the cells that are present in the biopsy sample.

BACKGROUND OF THE INVENTION

Different types of malignant tumors and their course of development during initiation, promotion and progression stages are characterized by multiple genetic and epigenetic events. These molecular events include cancer-causing gene mutations, gene fusions, genes overexpression, genes underexpression, genomic deletions, and post-translational modifications. Many of these events are used to diagnose cancer and/or defined as a target for targeted therapy. Detecting genetic alterations may aid in adjusting the treatment to a specific patient and to follow the occurrence of mutation during treatment.

Genetic mutations can be identified by genetic testing; however, these tests are expensive and the waiting time until receiving their results is relatively long (several weeks). By contrast, machine learning systems are useful for quickly screening through a large number of samples and identify mutations that may assist a physician in making a diagnosis. To this end, the diagnosis given by the machine learning system is required to be most reliable in terms of sensitivity and specificity and provide a high number of true results and a low number of false negative and false positive results.

It is therefore an object of the present invention to provide a method and system for training a model to reliably detect the presence of a gene mutation or of a tissue abnormality in an image of a biopsy sample and to reliably diagnose a disease, disorder or pathological condition which is associated with said gene mutation or tissue abnormality.

It is another object of the invention to provide a method and system for reliably detecting the presence of a gene mutation or a tissue abnormality in an image of a biopsy sample and for reliably diagnosing a disease, disorder or pathological condition which is associated with said gene mutation or tissue abnormality.

It is a further object of the invention to provide a method and system for providing a machine learning model with increased amount of training data.

Other objects and advantages of the invention will become apparent as the description proceeds.

SUMMARY OF THE INVENTION

In one aspect, there is provided a method for training a machine learning model to detect the presence of a gene mutation or a tissue abnormality in a biopsy sample, the method comprising the steps of:
  receiving a plurality of stained and annotated histology images, wherein each of the plurality of stained and annotated histology images includes at least one annotation of a tissue characteristic in at least a portion of the image;
  selecting slide patches out of maximum overlapping slide patches of each of the plurality of histology images to be used as training patches for the machine learning model based on a total score determined for each of the maximum overlapping slide patches;
  training the machine learning model by receiving the slide patches selected as training patches; and processing the selected slide patches, based on the annotations of the tissue characteristics included in the histology image using at least one sub-model configured to predict the presence of a gene mutation or a tissue abnormality in each of said histology images, thereby obtaining at least one prediction indicating a probability that a gene mutation or a tissue abnormality is present in the histology image; and
  validating the accuracy of the at least prediction.

According to one embodiment of the invention, prior to the training the machine learning model the method further comprises generating one or more synthetic patches based on the slide patches selected as training patches; and wherein the training the machine learning model includes receiving both the selected slide patches and the one or more generated synthetic patches and processing both the selected slide patches and the one or more generated synthetic patches.

According to another embodiment of the invention, the training the machine learning model further comprises, after receiving the slide patches selected as training patches or receiving both the selected slide patches and the one or more generated synthetic patches, augmenting the received patches, thereby obtaining one or more corresponding augmented patches; and wherein the processing includes processing said received patches and their one or more corresponding augmented patches.

According to a further embodiment of the invention, the stained and annotated histology images are prepared from biopsy samples harvested from a group of patients who were diagnosed with a disease, disorder or pathological condition or who were detected to carry a gene mutation.

According to yet a further embodiment of the invention, the total score is indicative of the relevance of the patch as a training patch based on the number of pixels in the patch that are positive for the presence of a tissue characteristic, the type of said tissue characteristic, and the number of pixels in the patch that are positive for tissue abnormality according to the received annotations.

In some embodiments of the invention, the processing involves using two or more sub-models configured to predict the presence of a gene mutation or tissue abnormality in each of said histology images, thereby obtaining two or more predictions, respectively, each prediction indicating a probability that a gene mutation or a tissue abnormality is present in the histology image.

In a specific embodiment of the invention, the processing involves using between 2 to 10 sub-models configured to predict the presence of a gene mutation or tissue abnormality in each of said histology images, thereby obtaining between 2 to 10 predictions, respectively, each prediction indicating a probability that a gene mutation or a tissue abnormality is present in the histology image According to one embodiment of the invention, the method further comprises determining a weight for each of the obtained predictions and providing a final weighted prediction indicating a probability that a gene mutation or a tissue abnormality is present in the histology image.

According to another embodiment of the invention, the method further comprises adjusting the model to preferably output positive or negative predictions.

In some embodiments of the invention, prior to selecting slide patches, the method further comprises the steps of:
(i) separating each of the plurality of stained and annotated histology images into non-overlapping, partially overlapping or maximum overlapping slide patches;
(ii) generating a first mask patch for each slide patch obtained in step (i) by determining a first binary matrix to represent said slide patch, the first binary matrix indicating the presence or absence of a tissue characteristic in each pixel within the first mask patch and the type of tissue characteristic present in said pixel according to the annotations of the tissue characteristics included in the received histology image and the coordinates of each pixel within the image, and combining the binary representations of all the patches originating from the same image into a first mask image;
(iii) determining a first score for each of maximum overlapping mask patches of the first mask image, the first score being indicative of the number of pixels in each mask patch that are positive for the presence of a tissue characteristic, and the type of said tissue characteristic;
(iv) separating each of the plurality of stained and annotated histology images into non-overlapping, partially overlapping or maximum overlapping slide patches;
(v) generating a second mask patch for each slide patch obtained in step (i) by determining a binary matrix to represent the slide patch, the binary matrix indicating whether a pixel within the second mask patch is positive or negative for a tissue abnormality according to the annotations of the tissue characteristics included in the received histology image and the coordinates of each pixel within the image, and combining the binary representations of all the patches originating from the same image into a second mask image; and
(vi) determining a second score for each of maximum overlapping mask patches of the second mask image, the second score being indicative of the number of pixels in each mask patch that are positive for tissue abnormality;
wherein either the slide patches obtained in step (i) or the slide patches obtained in step (iv), or both, are partially overlapping or maximum overlapping slide patches; and
wherein the total score is determined based on the first and second scores.

According to a specific embodiment of the invention, step (i) consists of separating each of the plurality of stained and annotated histology images into non-overlapping slide patches and step (iv) consists of separating each of the plurality of stained and annotated histology images into partially overlapping slide patches.

According to one embodiment of the invention, the method comprises the steps of:
(a) receiving a plurality of stained and annotated histology images prepared from biopsy samples harvested from a group of patients who were diagnosed with a disease, disorder or pathological condition or who were detected to carry a gene mutation, wherein each of the plurality of stained annotated histology images includes at least one annotation of a tissue characteristic in at least a portion of the image;
(b) separating each of the plurality of stained and annotated histology images into non-overlapping slide patches;
(c) generating a first mask patch for each slide patch obtained in step (b) by determining a first binary matrix to represent said slide patch, the first binary matrix indicating the presence or absence of a tissue characteristic in each pixel within the first mask patch and the type of the tissue characteristic present in said pixel according to the annotations received in step (a) and the coordinates of each pixel within the image, and combining the binary representations of all the patches originating from the same image into a first mask image;
(d) determining a first score for each of maximum overlapping mask patches of the first mask image, the first score being indicative of the number of pixels in each mask patch that are positive for the presence of a tissue characteristic, and the type of said tissue characteristic;
(e) separating each of the plurality of stained and annotated histology images into partially overlapping slide patches;
(f) generating a second mask patch for each slide patch obtained in step (e) by determining a binary matrix to represent the slide patch, the binary matrix indicating whether a pixel within the second mask patch is positive or negative for tissue abnormality according to the annotations received in step (a) and the coordinates of each pixel within the image, and combining the binary representations of all the patches originating from the same image into a second mask image;
(g) determining a second score for each maximum overlapping mask patches of the second mask image, the second score being indicative of the number of pixels in each mask patch that are positive for tissue abnormality;
(h) selecting slide patches out of maximum overlapping slide patches of the plurality of histology images to be used as training patches for the model based on a total score determined for each of the maximum overlapping slide patches;
(i) generating synthetic patches based on the slide patches selected as training patches in step (h);
(j) training the machine learning model by receiving the slide patches selected as training patches in step (h) and the synthetic patches generated in step (i); optionally augmenting said selected slide patches and synthetic patches, thereby obtaining one or more corresponding augmented patches; and processing the selected slides patches, synthetic patches and augmented patches based on the annotations of the tissue characteristics included in the histology image using two or more sub-models configured to predict the presence of a gene mutation or an abnormal cell in each of said histology images, thereby obtaining two or more predictions, each prediction indicating a probability that a gene mutation or a tissue abnormality is present in the histology image;

(k) determining a weight for each of the predictions obtained in step (j) and providing a final weighted prediction indicating a probability that a gene mutation or an abnormal cell is present in the histology image;

(l) validating the accuracy of the two or more predictions and/or of the final weighted prediction; and (m) adjusting the model to preferably output positive or negative predictions;

wherein steps (b), (i) and (m) are optional, and wherein steps (c) to (g) are carried out only when performing step (b).

In a further aspect, there is provided a method for detecting the presence of a gene mutation or tissue abnormality in a biopsy sample, using the model trained by the methods for training a model described above, the method comprising the steps of:

(I) receiving one or more stained histology images prepared from a biopsy sample harvested from a patient;

(II) segmenting each of the one or more stained histology images into non-overlapping or partially overlapping slide patches;

(III) generating a first mask patch for each slide patch obtained in step (II) by determining a first binary matrix to represent said slide patch using the trained model, the first binary matrix indicating the presence or absence of a tissue characteristic in each pixel within the first mask patch and the type of the tissue characteristic present in said pixel, and the coordinates of each pixel within the image, and combining the binary representations of all the patches originating from the same image into a second mask image;

(IV) determining a first score for each of maximum overlapping mask patches of the first mask image, the first score being indicative of the number of pixels in each mask patch that are positive for the presence of a tissue characteristic, and the type of said tissue characteristic;

(V) segmenting each of the one or more stained histology images into non-overlapping or partially overlapping slide patches;

(VI) generating a second mask patch for each slide patch obtained in step (V) by determining a binary matrix to represent the slide patch using the trained model, the binary matrix indicating whether a pixel within the second mask patch is positive or negative for tissue abnormality and the coordinates of each pixel within the image, and combining the binary representations of all the patches originating from the same image into a second mask image;

(VII) determining a second score for each of maximum overlapping mask patches of the second mask image, the second score being indicative of the number of pixels in each mask patch that are positive for tissue abnormality;

(VIII) selecting patches out of partially overlapping slide patches of the one or more stained histology images to be further processed by the model based on a total score determined for each patch, the total score being indicative of the relevance of the patch for further processing based on the number of pixels in the patch that are positive for the presence of a tissue characteristic, the type of said tissue characteristic, and whether the patch is positive for tissue abnormality; and (IX) processing each of the patches selected for further processing in step (VIII), using at least one sub-model configured to predict the presence of a gene mutation or tissue abnormality in each of said histology images, thereby obtaining at least one prediction indicating the probability that a gene mutation or tissue abnormality is present in the pathology image.

In some embodiments of the invention, the processing comprises using two or more sub-models configured to predict the presence of a gene mutation or abnormal cell in each of said histology images; and the method further comprises the step of:

(X) processing each of the predictions obtained in step (IX) according to the weight determined by the model trained according to the methods described above, and providing a single weighted prediction for the probability that a gene mutation or tissue abnormality is present in the biopsy sample.

In one embodiment of the invention, step (II) consists of segmenting each of the one or more stained histology images into non-overlapping slide patches and step (V) consists of segmenting each of the one or more stained histology images into partially overlapping slide patches.

In a specific embodiment of the invention, the tissue characteristic is a cell and the tissue abnormality is an abnormal cell.

In another specific embodiment of the invention, the abnormal cell is a cancer cell.

In some embodiments of the invention, the gene mutation is selected from gene fusion, gene overexpression, genes underexpression, genomic deletion, and post-translational modification.

In a specific embodiment of the invention, the gene mutation is a gene mutation associated with cancer.

In another specific embodiment of the invention, the gene mutation is in a gene selected from TP53, BRCA, BRAF, KRAS, MET tyrosine kinase receptor, HER2/ERBB2, ALK, NTRK, ROS1 and RET.

In a further aspect, there is provided a method for diagnosing a disease, disorder or pathological condition in a subject, comprising:

a. detecting the presence of a gene mutation or tissue abnormality in a biopsy sample harvested from a subject according to the method described above, and b. determining a positive or negative diagnosis of the disease, disorder or pathological condition, wherein if the presence of a gene mutation or tissue abnormality was detected, a positive diagnosis of the disease, disorder or pathological condition is determined, and wherein if the presence of a gene mutation or tissue abnormality was not detected, a negative diagnosis of the disease, disorder or pathological condition is determined.

In yet a further aspect, there is provided a method for increasing the amount of training data provided to a machine learning model configured to detect the presence of a gene mutation or tissue abnormality, the method comprising the steps of:

receiving a plurality of stained and annotated histology images, wherein the stained and annotated histology images are prepared from biopsy samples harvested from a group of patients who were diagnosed with a disease, disorder or pathological condition or who were detected to carry a gene mutation, and wherein each of the plurality of stained and annotated histology images includes at least one annotation of a tissue characteristic in at least a portion of the image; and selecting slide patches out of maximum overlapping slide patches of the plurality of histology images to be used as training patches for the machine learning model based on a total score determined for each of the maximum overlapping slide patches, wherein the total score is indicative of the relevance of the patch as a training patch based on the number of pixels in the patch that are positive for the presence of a tissue characteristic, the type of said tissue characteristic, and the number of pixels in the patch that are positive for tissue abnormality according to the received annotations.

According to one embodiment of the invention, prior to selecting slide patches, the method further comprises the steps of:
(i) separating each of the plurality of stained and annotated histology images into non-overlapping, partially overlapping or maximum overlapping slide patches;
(ii) generating a first mask patch for each slide patch obtained in step (i) by determining a first binary matrix to represent said slide patch, the first binary matrix indicating the presence or absence of a tissue characteristic in each pixel within the first mask patch and the type of tissue characteristic present in said pixel according to the annotations of the tissue characteristics included in the received histology image and the coordinates of each pixel within the image, and combining the binary representations of all the patches originating from the same image into a first mask image;
(iii) determining a first score for each of maximum overlapping mask patches of the first mask image, the first score being indicative of the number of pixels in each mask patch that are positive for the presence of a tissue characteristic, and the type of said tissue characteristic;
(iv) separating each of the plurality of stained and annotated histology images into non-overlapping, partially overlapping or maximum overlapping slide patches;
(v) generating a second mask patch for each slide patch obtained in step (i) by determining a binary matrix to represent the slide patch, the binary matrix indicating whether a pixel within the second mask patch is positive or negative for a tissue abnormality according to the annotations of the tissue characteristics included in the received histology image and the coordinates of each pixel within the image, and combining the binary representations of all the patches originating from the same image into a second mask image; and
(vi) determining a second score for each of maximum overlapping mask patches of the second mask image, the second score being indicative of the number of pixels in each mask patch that are positive for tissue abnormality;
wherein either the slide patches obtained in step (i) or the slide patches obtained in step (iv), or both, are partially overlapping or maximum overlapping slide patches; and
wherein the total score is determined based on the first and second scores.

According to a specific embodiment of the invention, step (i) consists of separating each of the plurality of stained and annotated histology images into non-overlapping slide patches and step (iv) consists of separating each of the plurality of stained and annotated histology images into partially overlapping slide patches.

According to another embodiment of the invention, the method further comprises generating one or more synthetic patches based on the slide patches selected as training patches, such that the selected slide patches and the one or more generated synthetic patches are used as training data.

According to yet another embodiment of the invention, the method further comprising augmenting the slide patches selected as training patches and the generated synthetic patches, thereby obtaining one or more corresponding augmented patches, such that the selected slide patches, the one or more generated synthetic patches and the one or more corresponding augmented patches are used as training data.

In a further aspect, the present invention provides a system comprising:
i. at least one computer hardware processor; and
ii. at least one non-transitory computer-readable storage medium storing processor-executable instructions, that when executed by the at least one computer hardware processor, cause the at least one computer hardware processor to perform the methods escribed above.

In yet a further aspect, there is provided a non-transitory computer-readable storage medium storing processor-executable instructions that, when executed by at least one processor, cause the at least one processor to perform steps of the methods described above.

BRIEF DESCRIPTION OF THE DRAWINGS

FIG. 1A schematically illustrates segmenting an image to non-overlapping patches.

FIG. 1B schematically illustrates segmenting an image to partially overlapping patches.

DETAILED DESCRIPTION OF THE INVENTION

The methods and systems for training a model to diagnose tissue abnormalities according to the invention address the need for a reliable diagnosis of diseases, disorders or pathological conditions using machine learning systems. The model trained according to the method of the present invention is based on receiving a significantly increased amount of training data from the pathology/histology images used as input. Hence, the model trained according to the method of the present invention more accurately detects the presence of tissue abnormalities and/or the presence of gene mutations expressed in cells, with significantly less false results (about 25% less false predictions) than those provided by models trained according to methods of the prior art. Moreover, according to the method of the present invention, a model for a reliable diagnosis of tissue abnormalities can be obtained by using a relatively small amount of starting data (i.e., images of biopsy samples) compared to the models of the prior art. This is because the model of the invention is configured to process the small amount of starting data in such a manner as to increase the amount of data that can be used as training data for the model's processing. Accordingly, the model trained according to the method of the present invention is also able to accurately detect the presence of a gene mutation in a biopsy sample, even for mutations that are less common in the population, and therefore, a relatively small amount of starting data is available for detecting these mutations using machine learning models.

The method and system of the present invention may assist pathologists in identifying the presence of tissue abnormalities (for example, abnormal cells such as cancer cells) in a biopsy sample and also assist physicians and pathologists in making the diagnosis of diseases, disorders and pathological conditions (such as cancer). Additionally, the method and system of the invention may be used for primary screening of multiple biopsy samples in a short time, such that only those biopsies diagnosed by the model as containing tissue abnormalities and gene mutations would be further analyzed using genetic testing. This primary screening would thereby reduce the time, effort and cost spent by health services, which without said screening would require to analyze all biopsies using the lengthy and costly genetic testing.

The terms "pathology image" and "histology image" as used interchangeably herein refer to an image showing the microscopic anatomy of cells and tissues in a sample, the sample having been sectioned, possibly stained, and mounted on a microscope slide.

Figure 3:
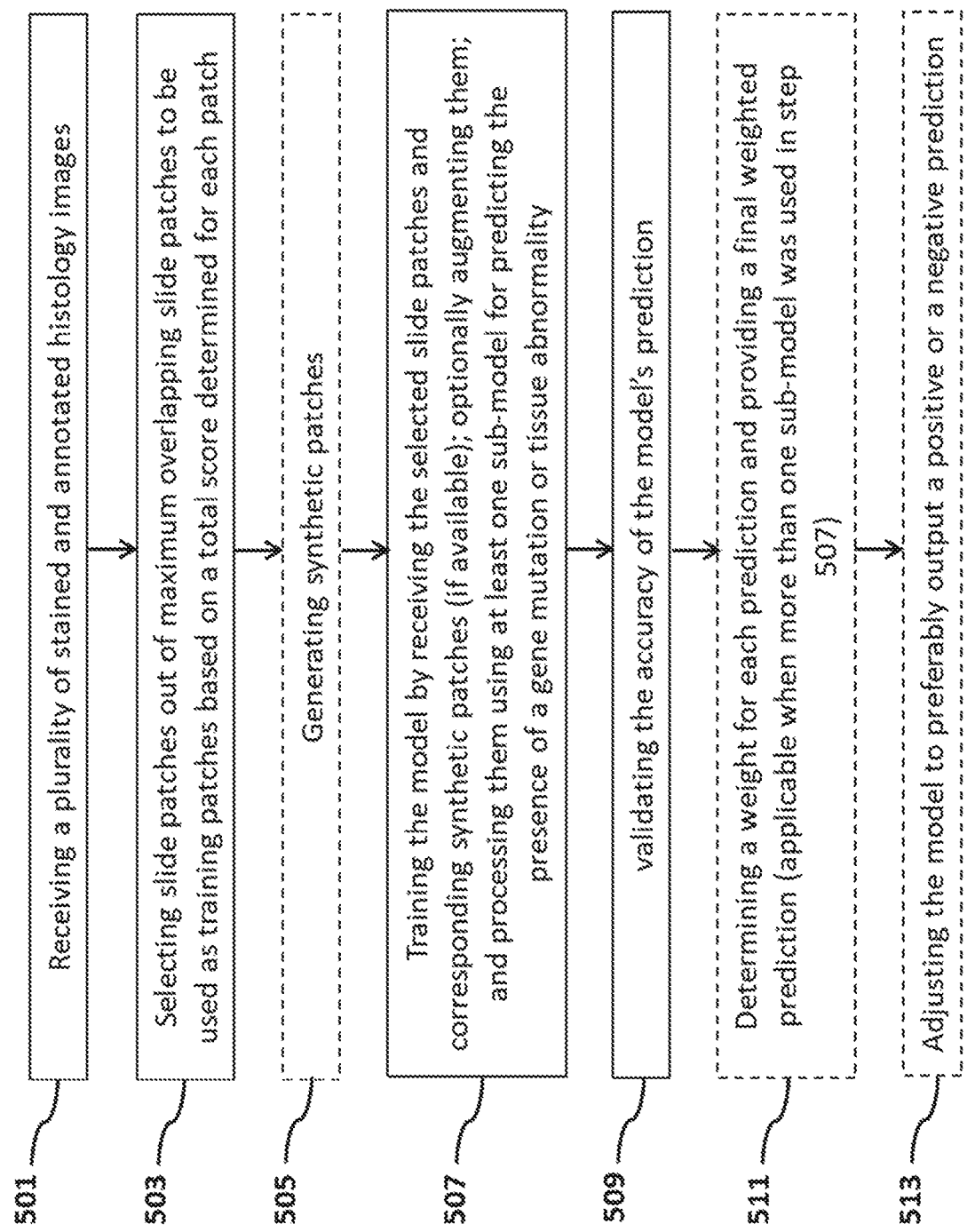
FIG. 3 shows steps in a method for training a machine learning model to detect the presence of a gene mutation or the presence of a tissue abnormality in a biopsy sample according to one embodiment of the invention. The steps that are shown with a dashed outline are optional.

In one aspect, the present invention provides a method for training a machine learning model to detect the presence of a gene mutation or a tissue abnormality in a biopsy sample as set forth in FIG. 3, the method comprising the steps of:
receiving a plurality of stained and annotated histology images, wherein each of the plurality of stained and annotated histology images includes at least one annotation of a tissue characteristic in at least a portion of the image (step 501 in FIG. 3);
selecting slide patches out of maximum overlapping slide patches of each of the plurality of histology images to be used as training patches for the machine learning model based on a total score determined for each of the maximum overlapping slide patches (step 503 in FIG. 3);
training the machine learning model by receiving the slide patches selected as training patches; and processing the selected slide patches, based on the annotations of the tissue characteristics included in the histology image using at least one sub-model configured to predict the presence of a gene mutation or a tissue abnormality in each of said histology images, thereby obtaining at least one prediction indicating a probability that a gene mutation or a tissue abnormality is present in the histology image (step 507 in FIG. 3); and
validating the accuracy of said one or more predictions (step 509 in FIG. 3).

According to one embodiment of the invention, prior to the training step, the method further comprises generating one or more synthetic patches based on the slide patches selected as training patches (step 505 in FIG. 3).

According to another embodiment of the invention, during the training of the machine learning step, the method also comprises augmenting the selected slide patches, thereby obtaining one or more corresponding augmented patches.

As would be appreciated by a person of skills in the art, in case the step of generating the one or more synthetic patches is carried out, the augmenting may occur for both the selected slide patches and the one or more generated synthetic patches. Similarly, if the one or more generated synthetic patches and/or the one or more augmented patches are available, the processing that occurs during the training step may also be carried out for the synthetic and/or augmented patches along with the originally selected slide patches.

Accordingly, in one embodiment of the invention, the method comprises the steps of:
(a) receiving a plurality of stained and annotated histology images, wherein each of the plurality of stained and annotated histology images includes at least one annotation of a tissue characteristic in at least a portion of the image (step 501 in FIG. 3);
(b) selecting slide patches out of maximum overlapping slide patches of each of the plurality of histology images to be used as training patches for the machine learning model based on a total score determined for each of the maximum overlapping slide patches (step 503 in FIG. 3);
(c) generating one or more synthetic patches based on the slide patches selected as training patches in step (b) (step 505 in FIG. 3);
(d) training the machine learning model by receiving the slide patches selected as training patches in step (b) and their one or more corresponding synthetic patches generated in step (c); augmenting said selected slide patches and synthetic patches, thereby obtaining one or more corresponding augmented patches; and processing the selected slide patches, one or more synthetic patches and one or more augmented patches based on the annotations of the tissue characteristics included in the histology image using at least one sub-model configured to predict the presence of a gene mutation or a tissue abnormality in each of said histology images, thereby obtaining one or more predictions, each prediction indicating a probability that a gene mutation or a tissue abnormality is present in the histology image (step 507 in FIG. 3); and
(e) validating the accuracy of said one or more predictions (step 509 in FIG. 3).

According to one embodiment of the invention, when more than one sub-model is used for predicting the presence of a gene mutation or a tissue abnormality, the method may optionally further comprise the step of determining a weight for each of the predictions provided by the sub-models and providing a final single weighted prediction indicating a probability that a gene mutation or a tissue abnormality is present in the histology image (step 511 in FIG. 3).

As would be appreciated, the methods described herein are computer-implemented, namely, the methods are carried out by a computer, or by a processor on a computer.

In one embodiment of the invention, the stained and annotated histology images are prepared from biopsy samples harvested from a group of patients who were diagnosed with a disease, disorder or pathological condition or subjected to genetic tests, and a gene mutation was detected in their genome. Accordingly, the model is trained to identify the specific tissue abnormality shown in the image of the biopsy sample harvested from these patients as a manifestation of the disease or the gene mutation, such that encountering the same specific tissue abnormality in images of biopsy samples harvested from other subjects serves as a positive diagnosis of said disease and/or a positive detection of said gene mutation in the image. In some embodiments of the invention, the presence of a gene mutation is detected by the model after the model was trained to identify abnormal cells carrying the gene mutation.

The term "tissue abnormality" or "abnormal tissue characteristic" as used herein refers to a tissue characteristic that is different in its morphology (shape, size, structure or arrangement), from other normal (healthy) tissue characteristic of the same type, such that the changes in morphology may indicate that the subject from whom the biopsy was taken is suffering from of a disease, disorder or pathological condition and may also indicate that said subject is likely to carry a gene mutation. The term also encompasses a tissue characteristic that is not present in healthy tissues and its mere presence is indicative of a pathological condition (such as plaques, protein aggregates, foreign cells, and scar tissue). Furthermore, a tissue abnormality can be visually detected in a pathology/histology image of a biopsy sample. Similarly, the term "abnormal cells" or "cellular abnormality" as used interchangeably herein refers to a cell that is different in its morphology from other normal cells of the same classification, and said abnormality may indicate that the subject from whom the biopsy was taken is suffering from of a disease, disorder or pathological condition and may also indicate that the cell is likely to carry a gene mutation.

The term "tissue characteristic" as used herein refers to any type of structure present in a tissue or a feature displayed in the tissue. Non-limiting examples of tissue characteristics include a cell, a nucleus, a nucleolus, a mitotic figure, a protein, extracellular matrix, nuclear pleomorphism, a perineural invasion, an epithelial tubule formation, a fiber, fibrils, an axon, a synapse, a membrane, mitochondrion, endoplasmic reticulum, Golgi apparatus, a lysosome, peroxisome, an area of necrosis, an area of stroma, an area of cancer cells, a nuclear grade, a chromosome, a blood vessel, a plaque area, cell or protein aggregates, scar area (fibrous area), and a distance between at least two of the above.

The terms "disease", "disorder" and "pathological condition" may be used interchangeably in the context of the present invention and generally refer to any condition that impairs the normal functioning of the body which is manifested by tissue abnormalities that can be visually detected in an image of a biopsy sample. Non-limiting examples of diseases, disorders and pathological conditions that can be diagnosed by the models trained by the methods described herein include cancer, inflammatory diseases, infectious diseases, cirrhosis, genetic diseases, diabetic nephropathy (DN), non-diabetic renal disease (NDRD), asthma, chronic obstructive pulmonary disease (COPD), and neurodegenerative diseases.

In one embodiment of the invention, the tissue abnormality is an abnormal cell.

In a specific embodiment of the invention, the disease is cancer, such that the tissue abnormality is a cancer cell and the gene mutation is a cancer-causing mutation.

The terms "mutation" and "gene mutation" as interchangeably used herein refer to a permanent alteration in the DNA or RNA sequence that makes up a gene, such that the sequence differs from what is found in most individuals in the population. The mutation can affect a single nucleotide, as well as a large segment of a chromosome that includes multiple genes. The mutation may be a substitution of one or more nucleotides within the gene sequence with other nucleotides, a deletion of one or more nucleotides from the gene sequence, or an insertion of one or more nucleotides to the gene sequence.

The terms "cancer-causing mutation" or "mutation associated with cancer" as used herein refer to a mutation that was found in the literature to promote the transformation of a cell into a cancer cell or otherwise contribute to the development of a tumor. These mutations often lead to dysregulation in cell proliferation pathways, by increasing the levels and/or activity of proteins directly involved in cell division pathways, decreasing the levels and/or activity of proteins involved in apoptosis, and suppression of cell proliferation or mutations the lead to impairment of DNA repair activity. Non-limiting examples of mutations associated with cancer include mutations in the p53 tumor suppressor (TP53) gene, mutations that cause inactivation of breast cancer (BRCA) gene, mutations in B-Raf (BRAF) gene (such as V600E and V600K), mutations in MET (mesenchymal-epithelial transition) tyrosine kinase receptor gene (such as mutation at D1010 position, mutation as Y1003 position, deletion of exon 14, or a splice mutation in exon 14), mutations that cause amplification of human epidermal growth factor receptor 2/Erb-B2 Receptor Tyrosine Kinase 2 (HER2/ERBB2) gene, neurotrophic receptor tyrosine kinases (NTRK) genes fusions, anaplastic lymphoma kinase (ALK) gene fusions, fusions of the gene encoding proto-oncogene tyrosine-protein kinase ROS (ROS1), fusions of rearranged during transfection (RET) proto-oncogene (RET) and mutations in the KRAS gene. The mutations can be of various types, for example, gene fusions, genes overexpression, genes underexpression, genomic deletions, and post-translational modifications.

After extraction of the biopsy from the donor or patient, the sample is sectioned into slices of a desired thickness and the slices are mounted on a slide, e.g., a microscopic slide. Before sectioning, the biopsy sample may be fixated. The slices are then stained by one or more histological staining techniques so that a tissue characteristic is visible and captured as an image. The captured images of the slice are then magnified and annotated. Accordingly, a pathology/histology image used as input to the model trained according to the method described herein is an annotated and magnified image of a stained slice mounted on a slide.

It should be noted that the preparation of a pathology/histology image as described above can be carried out by any method or technique routinely used or well known in the art.

The biopsy samples may be extracted from any tissue (antemortem or postmortem) that is suspected to be affected by a disease, disorder or pathological condition, for example, a tissue that includes a portion of a tumor. Thus, the pathology image may be of a tissue that provides evidence of the presence of a diseases, disorder or pathological condition. Examples of tissues from which a biopsy sample may be harvested include, but are not limited to, liver, lung and airways, breast, ovary, uterus, cervix, vagina, testicle, spleen, lymph node, bladder, kidney, brain, esophagus, stomach, intestine, gall bladder, mouth, lip, nose, pancreas, prostate, colon, nervous tissue and skin.

The biopsy samples may be fixed, for example, fresh frozen or formalin-fixed paraffin-embedded (FFPE), prior to sectioning.

The slices may be stained using any stain selected to highlight tissue or cellular structures or other features of interest useful in tissue analysis. The tissue samples may, for example, be prepared by hematoxylin and eosin stain (H&E stain). Examples of general staining methods include, but are not limited to, hematoxylin and eosin (H&E), trichrome, periodic acid Schiff (PAS), autoradiography, enzyme histochemistry, immunofluorescence, and immunohistochemistry. Specific stains include, but are not limited to, acid fuchsin, Aldehyde Fuchsin, Alician Blue, Alizarin Red S, Alkaline Phosphatase, aniline blue, Azan Stain, biebrich scarlet, Bielschowsky Stain, Cajal Stain, chromotrope 2R, Congo Red, Cresyl Violet, Eosin, fast green FCF, Fontana-Masson, Giemsa Stain, Golgi Stain, Gomori Trichrome, Heidenhain's AZAN trichrome stain, Hematoxylin, Iron Hematoxylin, light green SF yellowish, Luna Stain, Luxol Fast Blue, Mallory Trichrome, martius yellow, Masson Trichrome, Melanin Stains, methyl blue, milling yellow, Movat's Pentachrome, Mucicarmine, Mucin Stains, Myloperoxidase (MPO), Nissl Stains, Nuclear Fast Red, Oil Red 0, orange G, Orcien Stain, Osmium Tetroxide, Papanicolaou Stain, Perl's Iron Stain, phloxine, Phosphotungstic Acid-Hematoxylin (PTAH), picric acid, PicroSirius Red (polarized), ponceau 6R, Prussian Blue, Reticular Fiber Stain, Romanowsky Stains, Safranin 0, Schmorl's Stain, Silver Stains, Sudan Stains, Tartrazine, tartrazine, Toluidine Blue, Van Gieson, Verhoeff Stain, Von Kassa Stain, water blue, Weigert's Elastic Stain, Wright's Stain, and xylidine ponceau.

The slices may also be immune-stained. The slides could optionally be labeled by antibodies or probes, either of which could be fluorescently labeled or conjugated to elemental isotopes for mass spectrometry. In general, any form of immunohistochemistry staining is suitable according to the present invention.

The staining of the slices may be physically (using actual dyes or labels) or virtually (using a model specifically trained for virtually staining a tissue slice).

An image of the slices may be captured using an imaging instrument, such as a microscope and digital camera, or a microscope slide scanner, and corresponding software.

The magnification of the image of the stained, annotated, and mounted slices may vary between 4× and 400×. In one embodiment, the image of the slide is magnified between 10× and 100×. In a specific embodiment, the magnification of the images is between 20× and 40×.

The annotation of the biopsy slide consists of information regarding the identification of the tissue characteristic visible in the stained slide, the classification (type) of said tissue characteristic, and whether the tissue characteristic is indicative of a disease. For example, the tissue characteristic may be identified as a cell, the type of which may be an epithelial cell, which may be further indicated as a cancer cell or a non-cancer cell.

The annotations may be assigned by a pathologist or by another medical professional. Alternatively, the annotations may be assigned based on the output of a model specifically trained for identifying and annotating tissue characteristics in a tissue slide.

It should be noted that the pathology/histology image used as input in the first step of the method of the invention includes at least one annotation of a tissue characteristic in at least a portion of the image. The at least one annotation may be that of a tissue characteristic of any type, which in turn may be a tissue abnormality or a normal (healthy) tissue. Otherwise, if a certain pathology image does not contain any tissue characteristic or contains a tissue characteristic that could not be identified and is therefore not annotated, this pathology image would not be used as input to the model.

The patches which represent a portion of the image are normally of a rectangular or a square shape. In one embodiment of the invention, the patches are at a size ranging between 92×92 pixels and 2048×2048 pixels.

The present disclosure refers to three types of patches: (1) non-overlapping patches, (2) partially overlapping patches, and (3) maximum overlapping patches.

Figure 1A:
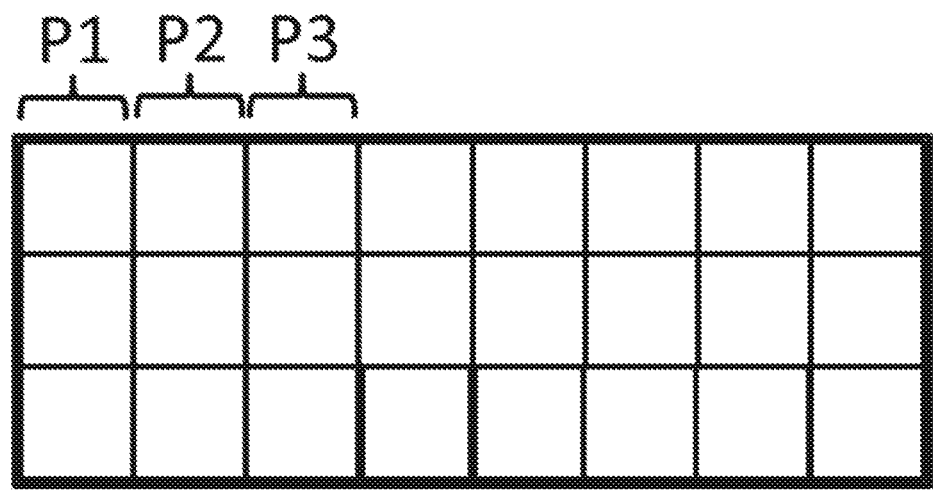
FIGS. 1A-1B schematically illustrate methods for segmenting an image to multiple patches (P).

When separating the histology image into non-overlapping patches, a certain pixel can only be present in one patch of the image as illustrated in FIG. 1A.

Figure 1B:
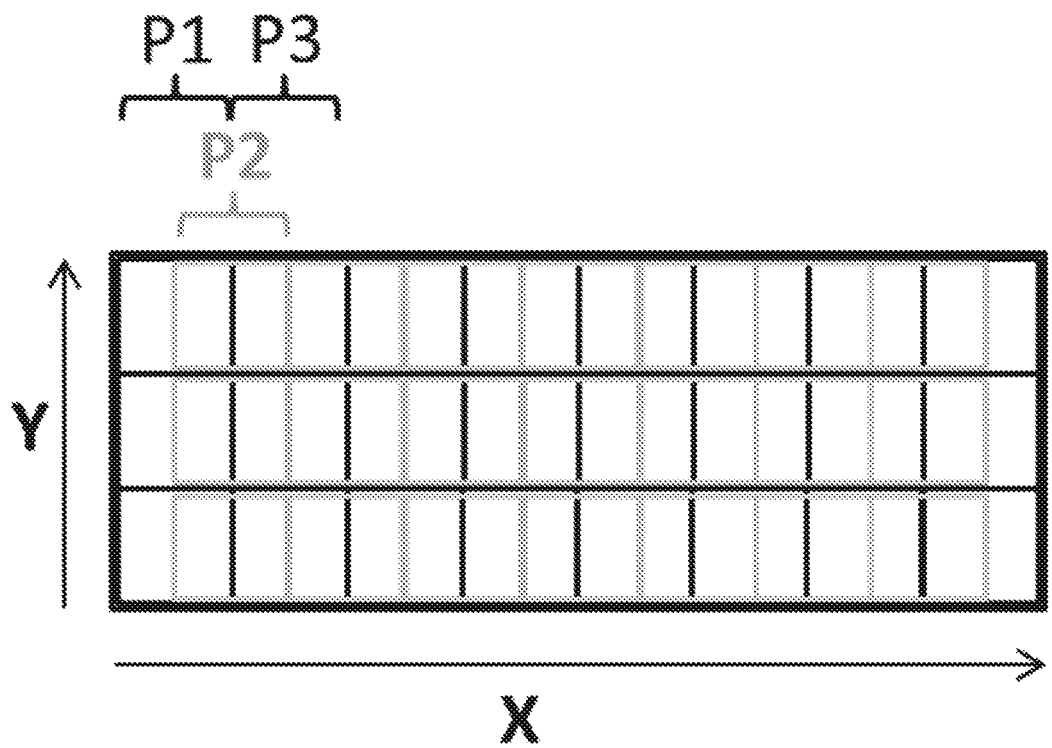

As illustrated in FIG. 1B, in a partially overlapping segmentation, some of the pixels of the image are present in at least two patches. While FIG. 1B illustrates a partial overlap between patches only horizontally, namely, on the X-axis of the scanned image (for the sake of simplicity and clarity), it should be noted that the partial overlap may alternatively occur only vertically, namely, on the Y-axis of the scanned image or on both the X and Y axes. According to the method described herein, partially overlapping patches are separated by two or more pixels on at least one of the two axes. In other words, a certain patch would have at least two columns of pixels that are not present in the adjacent patch on the X-axis or at least two rows of pixels that are not present in the adjacent patch on the Y-axis. This means that the coordinates of two adjacent patches would be at least two pixels apart on at least one of the X and Y axes of the image.

According to one embodiment of the invention, partially overlapping patches are adjacent patches having about 10 to 90% overlap, such that 10 to 90% of the pixels present in one patch are also present in the adjacent patch. In another embodiment, partially overlapping patches have a 50 to 80% overlap. In a specific embodiment, partially overlapping patches have about a 75% overlap. In a non-limiting example, segmenting a pathology image into patches at a size of 400×400 pixels having a 75% overlap would result in adjacent patches that are separated by 100 pixels on either one of the X and Y axes. According to this specific example, the segmentation would result in a first patch having the coordinates (0,0) and the adjacent patch on the X-axis would have the coordinates (100,0) and a patch adjacent to the latter patch on the X-axis would have the coordinates (200,0) and so forth.

The term "partially overlapping segmentation" as used herein refers to the segmentation of an image into patches that are partially overlapping on at least one of the X and Y axes. Accordingly, the term encompasses segmentation to patches that are partially overlapping on the X-axis but are non-overlapping on the Y-axis and vice versa. The term also encompasses segmentation into patches with different overlap percentages on each of the X and Y axes, for example, a 75% overlap between adjacent patches on the X-axis and 60% overlap between adjacent patches on the Y-axis.

The term "maximum overlapping patches" as used herein refers to adjacent patches that are separated by a single pixel on both of the X and Y axes. In other words, only a single column of pixels of one patch is not shared with the adjacent patch on the X-axis and only a single row of pixels of one patch is not shared with the adjacent patch on the Y-axis. Accordingly, the term "maximum overlapping segmentation" refers to the segmentation of an image into patches that are maximally overlapping on the X-axis and the Y-axis. Maximum overlapping segmentation would thus result in a first patch having the coordinates (0,0), an adjacent patch on the X-axis having the coordinates (1,0), and a patch adjacent to the latter patch on the X-axis having the coordinates (2,0) and so forth. According to the maximum overlapping segmentation, the image is segmented to the entire set of possible patches.

In the step of selecting slide patches of the method, a total score is determined for each possible slide patch in the histology image. In one embodiment of the invention, the total score is determined for maximum overlapping slide patches of the histology image. The total score for a certain patch is determined based on the number of pixels that show a tissue characteristic (e.g., a cell) in the patch, the number of tissue characteristics that are of increased relevance to the type of pathological condition or to the gene mutation of interest, and whether the patch contains an area of tissue abnormalities (such as a cancerous area), namely, if the patch contains pixels that are positive for a tissue abnormality. Accordingly, the total score is indicative of the overall relevance of a certain patch to be used as training data or as a patch to be selected for further processing. Additionally, determining a total score for each of the maximum overlapping patches in the image results in obtaining data for each of the coordinates in the image with respect to the presence of a tissue characteristic, its type or classification, and whether or not the tissue characteristic is abnormal (for example, has abnormal morphology).

As would be appreciated by a person skilled in the art, the total score includes a vector of sub-scores in the form of numbers, each sub-score indicating the area (i.e., the number of pixels) in the patch that is positive for the presence of a tissue characteristic, the area that is positive for certain types of tissue characteristics (for example, the number of pixels that contain a cell of a certain classification), and the area that is positive for a tissue abnormality (i.e., pixels containing an abnormal tissue characteristic).

The determination of the total score further comprises processing said sub-scores by a model of reinforcement learning, such that the reinforcement learning model determines the relevance of the patch as a training patch or as a patch to be selected for further processing. Thus, the total score also includes the weights of each sub-score, i.e., the contribution of each sub-score to the relevance of the patch to be used for training or further processing.

In general, the determining of a score is a known process in the field of machine learning and is an iterative process that tests the possible combination of sub-scores indicative of the relevance of the patch to a certain task. The iterative process information consists of the possible thresholds for inclusion of certain patches in the training process and the validation result for such training. Afterwards, various algorithms (such as random, hyperband, Bayesian, etc.) are known to adjust the process to the optimal threshold for training a specific task.

For example, a patch having more pixels positive for a tissue characteristic may have a higher score than a patch having less pixels showing a tissue characteristic, since a patch with more tissue characteristic may provide more information as training data that a patch with let characteristics. In another example, a patch having a larger cancer area (more pixels positive for cancer cells as an example of a tissue abnormality) may be determined as more relevant to be used for training or further processing than another patch having a smaller area of cancer cells.

In yet another example, the relevance of a patch can also be dependent on the type of tissue characteristic or the classification of the cells present in the patch and on the gene of interest. Accordingly, in a model trained to detect a gene mutation associated with a certain type of carcinoma, a patch having a larger area of epithelial cells would receive a higher total score by the reinforcement learning model than a patch having a large area of other types of cells; however, in a model trained to detect a gene mutation associated with a certain type of lymphoma, the presence of lymphocytes would lead to a higher total score of a patch than other types of cells. It should be noted that the classification of the cells present in a patch may lead to a graduated total score rather than a binary scale (namely "yes or no" scale), such that cell types are ranked according to their relevance to the cancer type associated with the gene mutation of interest and the total score is graduated accordingly.

It should be noted that the weight assigned to each factor (such as the number of tissue characteristic, their type and/or classification, and the tissue abnormality area) in the determination of the total score can be adjusted during the training of the model in order for the model to give more accurate predictions and diagnosis.

Subsequently, the maximum overlapping patches are selected to be either discarded or used further in the model, based on their total score. Accordingly, only slide patches deemed relevant by the model would be further processed in the next steps of the method.

It should be noted that patches containing 100% normal/healthy tissue characteristics may also be selected by the model to be used as training data, for example, for diagnosing subjects that do not have a disease and/or do not express the gene mutation of interest. Alternatively, patches from histology images obtained from control patients or healthy individuals may also be used as training data images containing all healthy tissue characteristics.

It should also be noted that training the model to detect a gene mutation or tissue abnormality in an image of a biopsy sample, inherently includes the training of the model to detect normal (healthy) tissue characteristic, since a distinction between normal and abnormal tissue characteristics generally requires learning to identify both normal and abnormal tissue characteristics. Accordingly, although the present disclosure mentions, for the sake of brevity, the detection of gene mutation or tissue abnormality, it is obvious that detection of a normal tissue characteristic, a normal cell and/or a cell that does not express a gene mutation is also encompassed by the present invention.

Following the step of selecting slide patched as training patches, the method may optionally comprise a step of generating one or more synthetic patches. This generation of synthetic patches is normally carried out using known models of Generative Adversarial Networks (GANs). The purpose of creating synthetic images is to artificially generate more data points for the model to be trained with, instead of obtaining more images, more biopsy samples, and/or more patients in order to provide the training data. Thus, the synthetic patches, when generated, are also included in the training data in the method of the invention.

It should be noted that the selection of slide patches may be randomly carried out by the model, such that each time the model performs its learning according to the methods of the invention, a different number of patches and/or different patches out of the maximum overlapping patches that received a suitable total score may be selected as training data.

After having the selected the slide patches (and their corresponding synthetic patches, if applicable) as training data, the model is trained, based on the training data, to identify the presence of a gene mutation or of a tissue abnormality in the histology image.

Optionally, each slide patch selected as training data and each synthetic patch (if applicable) may first be augmented in order to obtain at least one corresponding augmented patch. The synthetic patches (when generated) can also be augmented. Augmented patches are those in which certain adjustments are made to the original patch. Non-limiting examples of augmentation include cropping, scaling, rotating, blurring, changing brightness and/or contrast of the original image, RGB shifting, changing the hue saturation lightness or the hue saturation value, channel shuffling, applying contrast limited adaptive histogram equalization (CLAHE), changing the gamma value, applying median blur, changing to gray scale, and compressing the image. It should be noted that the specific patch selected or the specific manner in which the patch is augmented (for example, rotated or blurred) may be randomly determined by the model, such that each patch would have one or more corresponding augmented patches. Furthermore, each slide patch selected as training data by the model and, if applicable, each corresponding synthetic patch may be augmented in a different manner. Moreover, in cases where the same slide patch or synthetic patch is re-used in the training step, each of these patches may be augmented in the same or a different manner.

Alternatively, the model can be adjusted to provide a fixed number of augmented images, the augmentation manner of which can be pre-determined or randomly created by the model during training.

Using augmented images/patches would enable training the model to recognize elements in the image even if the element is presented in the original image differently than in reality. In a non-limiting example, a cell in a pathology image may appear blurry due to a technical difficulty during the preparation of the pathology image. Thus, in order for a model to be accurate, the model should recognize cells also in a blurry state. Accordingly, the model is trained by inputting blurry-augmented images as training images so that the model would learn to recognize blurry elements in an image.

Optionally, the selected slide patches and the one or more generated synthetic patches are augmented in a separate step prior to the training step.

Accordingly, the "training data" or "training patches" include the selected slide patches and, optionally, the one or more generated synthetic patches and/or the one or more augmented patches.

Then, the training patches are processed by at least one sub-model that "learns" to identify the gene mutation or tissue abnormality based on the annotations for the tissue characteristics present in these patches received in the first step of the method and predicts the presence of a gene mutation or the tissue abnormality. Thus, the sub-model gives its prediction of the probability that a gene mutation or tissue abnormality is present in the pathology/histology image, such that one or more (depending on the number of sub-models used) independent predictions are obtained for each histology image.

In one embodiment, 2 to 10 different sub-models are used to process the training data. In another embodiment, 3 to 8 different sub-models are used. In a specific embodiment, 6 sub-models for predicting the probability that a gene mutation or tissue abnormality is present in the pathology image are used.

Although each of the independent sub-models performs the same processing operations, the sub-models differ one from another in that each of them receives a different set of training data. Accordingly, each sub-model outputs an independent prediction of the likelihood that a gene mutation or tissue abnormality is present in the biopsy image, and the independent predictions may be the same or different one from another.

It should be noted that the training step can be repeated by receiving the same slide patches selected as training patches and the generated synthetic patches (if applicable), re-augmenting said selected slide patches and synthetic patches, and re-processing said the selected slide patches, synthetic patches and augmented patches based on the annotations of the tissue characteristics included in the histology image using at least one sub-model for predicting the presence of a gene mutation or tissue abnormality in each of said histology images.

After receiving the model's one or more predictions, the model then validates the accuracy of said prediction(s), by using one or more patches that are different from the patches used as training data (referred to herein as "validation patches") and providing one or more predictions (depending on the number of sub-models used) of whether said one or more patches contain a tissue abnormality or a cell carrying a gene mutation. The prediction is then validated against the information known about the validation patch with respect to whether the patch is known to contain a tissue abnormality or a cell that carries (expresses) a gene mutation.

The steps of selecting, training and validating can be repeated until the training is complete, namely, until the prediction(s) provided by the model for the one or more validation patches is accurate. In other words, the model first selects a predetermined number of patches (for example, 200-1000 patches) as training data, uses said training data to provide its prediction(s) and validates the prediction(s). If the prediction(s) provided by the model for the validation patches is accurate, the training is complete and the model is considered trained. If the prediction(s) is not accurate or improvements are deemed necessary to increases the model's accuracy of prediction(s), then the model repeats the selecting, training and validating cycle for any number of times using additional randomly selected slide patches until the prediction(s) is accurate. Thus, a trained model for detecting the presence of a gene mutation or a tissue abnormality in a biopsy sample that is the origin of a histology image is obtained.

In one embodiment of the invention, the training patches are processed by two or more sub-models, such that a set of two or predictions for each pathology/histology image is obtained. In a specific embodiment of the invention, the model calculates an average of all the predictions provided by the sub-models to provide a final probability that a gene mutation or a tissue abnormality is present in the biopsy sample. In another specific embodiment, the model determines a weight for each of the predictions provided by the sub-models, such that the final prediction is a weighted prediction. A prediction that was accurate according to the annotations received in the first step of the method for the patch that was processed by the sub-models would be adjusted to have more power in controlling the learning process of the machine learning model. In other words, based on the annotations already known for a pathology image, the relative success of each sub-model in predicting the probability that a gene mutation or a tissue abnormality is present in the pathology image compared to the other sub-models can be determined. Accordingly, the predictions given by the relatively successful sub-models would have greater diagnostic power in the model than the other sub-models. The model then takes into consideration each prediction provided by the two or more sub-models and the weight determined for each prediction and provides a final single weighted prediction indicating the probability that a gene mutation or a tissue abnormality is present in the histology image.

Various machine learning algorithms (such random forest, xgboost, catboost, etc.) are known to determine a weight by receiving the output of several sub-models and optimizing a final output for a specific task.

Optionally, the trained model can be adjusted to output preferable results, either positive or negative, based on the importance of the implications of having a false positive result compared to having a false negative result. In a non-limiting example, when diagnosing cancer, falsely determining that a patient does not have cancer, while the patient actually does have cancer, may have greater implications than falsely diagnosing cancer in a healthy patient. In such cases, the model is set to prefer a positive prediction (e.g., a positive diagnosis of cancer) rather than a negative prediction (e.g., negative diagnosis of cancer) to ensure that all the negative predictions are indeed true negative results. This preference for positive predictions may be at a cost of having some positive predictions that are false.

Thus, the method for training a model described above may further comprise the step of adjusting the trained model to preferably output a positive or negative prediction (step 513 in FIG. 3).

According to one embodiment of the invention, the adjustment of the trained model to preferably provide a positive or negative result is implemented using a "punishing system". The prediction given for a certain pathology image by each sub-model is tested against the data known for said pathology/histology image or against the annotation of said pathology/histology image, namely, whether the pathology image was prepared from a biopsy harvested from a subject who was diagnosed with a certain disease or pathological condition or known to carry a gene mutation or from a healthy subject and whether said pathology image contains a tissue abnormality or presents a cell expressing the gene mutation of interest. In other words, the correctness of each prediction of each sub-model is tested. Each prediction receives a score, such that the sub-model is punished (i.e., receives a deducted score) if it outputs a mistaken prediction. For example, if a sub-model predicted a likelihood of less than 0.5 (namely, less than 50%) that a gene mutation is present in a pathology image confirmed to have a cell expressing said mutation, then the sub-model will receive a deducted score compared to a sub-model predicting a probability of more than 0.5 that a gene mutation is present in the same pathology image. The amount of deduction corresponds to the level of the mistake or how far off the prediction was from the truth. In the above example, a sub-model predicting a likelihood of 0.2 that a gene mutation is present in a pathology image confirmed to have a cell expressing said mutation, would be deducted more score than a sub-model outputting a probability of 0.4.

Accordingly, in a model adjusted to preferably output positive predictions, the punishment would be more severe (greater deduction in the score) for a false negative result than for a false positive result. By contrast, in a model adjusted to preferably output negative prediction, more score would be deducted for false positive predictions than for false negative results.

In another embodiment of the invention, the adjustment to output preferable results is carried out by determining a threshold that defines whether a certain prediction is positive or negative. Accordingly, an adjustment to preferably output positive results would be carried out by lowering the threshold for positive results and an adjustment to preferably output negative results would be carried out by elevating the threshold for positive results. For example, without adjustment of the output, the threshold that defines whether a prediction is positive or negative is set to 0.5, such that a probability provided by a sub-model for the presence of a gene mutation or tissue abnormality of more than 0.5 is considered positive and a probability of less than 0.5 is considered negative. In a model that is adjusted to output positive results, the threshold is set to be lower than 0.5, for example, 0.3. Accordingly, a prediction provided by a sub-model for the presence of a gene mutation or tissue abnormality of more than 0.3 is considered positive and a prediction of less than 0.3 is considered negative. Of course, the above numbers are simply as example and should not be considered as limiting in any way.

In some embodiments of the invention, when the model uses two or more sub-model for processing the training data, the determining a weight for each prediction occurs prior to the adjusting the model to preferably output positive or negative predictions. In other embodiments, each sub-model is first adjusted to output a positive or negative prediction and then the determining a weight for each (adjusted) prediction takes place.

In a method for training a model to detect a gene mutation or a tissue abnormality, according to some embodiments, prior to the step of selecting slide patches out of maximum overlapping slide patches to be used as training patches, the method further comprises the steps of:
  (i) separating each of the plurality of stained and annotated histology images into non-overlapping, partially overlapping or maximum overlapping slide patches;
  (ii) generating a first mask patch for each slide patch obtained in step (i) by determining a first binary matrix to represent said slide patch, the first binary matrix indicating the presence or absence of a tissue characteristic in each pixel within the first mask patch and the type of tissue characteristic present in said pixel according to the annotations received in the first step and the coordinates of each pixel within the image, and combining the binary representations of all the patches originating from the same image into a first mask image;
  (iii) determining a first score for each maximum overlapping mask patches of the first mask image, the first score being indicative of the number of pixels in each mask patch that are positive for the presence of a tissue characteristic), and the type of said tissue characteristic;
  (iv) separating each of the plurality of stained and annotated histology images into non-overlapping, partially overlapping or maximum overlapping slide patches;
  (v) generating a second mask patch for each slide patch obtained in step (i) by determining a binary matrix to represent the slide patch, the binary matrix indicating whether a pixel within the second mask patch is positive or negative for tissue abnormality according to the annotations received in the first step the method and the coordinates of each pixel within the image, and combining the binary representations of all the patches originating from the same image into a second mask image; and (vi) determining a second score for each maximum overlapping mask patches of the second mask image, the second score being indicative of the number of pixels in each mask patch that are positive for tissue abnormality;

wherein either the slide patches obtained in step (i) or the slide patches obtained in step (iv), or both, are partially overlapping or maximum overlapping slide patches; and wherein the total score determined for the slide patches is based on the first and second scores.

According to step (i) described above, the histology image is segmented into a plurality of slide patches, each patch comprising of a plurality of adjacent pixels representing a portion of the image. The patches obtained in step (i) are either non-overlapping patches, partially overlapping patches, or maximum overlapping patches.

Figure 2:
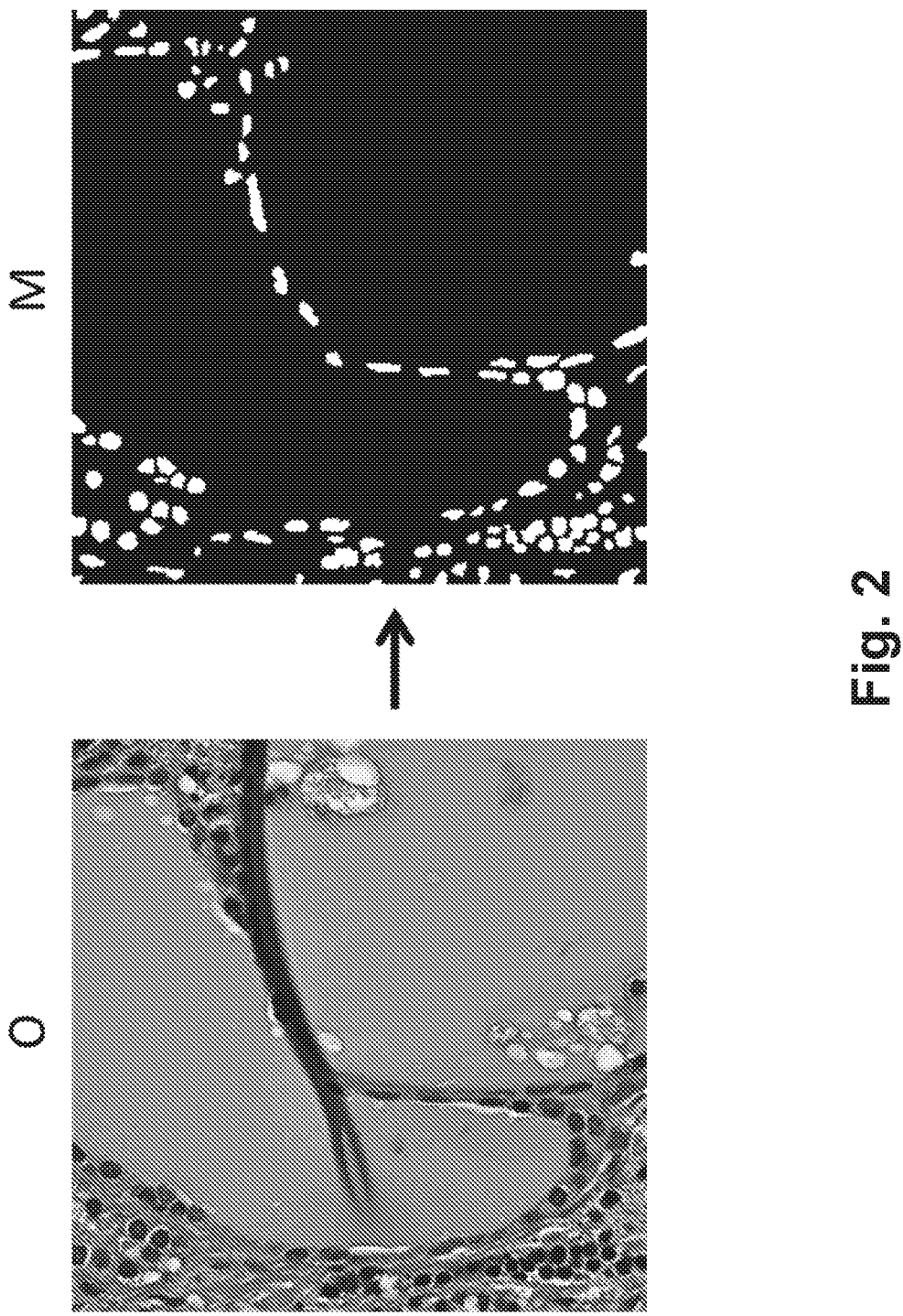
FIG. 2 shows a patch of the original (O) image stained with hematoxylin and eosin and its corresponding mask (M) image.

In step (ii) described above, a first mask representation of the slide patch, namely, a binary representation of the slide patch having identical size as the slide patch, is created in the form of a matrix, the matrix storing information with respect to each pixel within the patch including the coordinates of the pixel relative to the original histology image, and whether said pixel shows at least a portion of a tissue characteristic (e.g., a cell) and the type of said tissue characteristic (for example, a protein aggregate or a cell and the classification of the cell). The detection of the presence or absence of a tissue characteristic in the patch and the type of the tissue characteristic detected to be present are made in reference to the annotations received in the first step of the method. An example of a mask image generated for a slide patch that was originally stained with H&E is shown in FIG. 2.

Subsequently, a first mask image of the entire pathology/histology image is created by combining the binary representations of all the patches belonging to the same image into a single first mask image having the same size as the original histology image.

According to step (iii) described above, a first score is determined for any possible patch of the first mask image obtained in step (ii), namely, the first score is determined for each of the maximum overlapping mask patches of the first mask image. The first score is essentially a vector of numbers indicating the area (i.e., the number of pixels) in the patch that is positive for the presence of a tissue characteristic and the area that is positive for certain types of tissue characteristic. The first score also takes into consideration the type of the tissue characteristics, as well as the classification of the cells in the patch, such that different types of tissue characteristics or different classification of cells lead to different first scores, depending on the type of tissue characteristics or the classification of cells that are more relevant to the disease, disorder or pathological condition of interest, as described above. Therefore, the first score is indicative of the area of pixels in each patch that are positive for the presence of a tissue characteristic and the type of said tissue characteristic.

Accordingly, the first score or at least a part of the parameters indicated by the first score serves as a sub-score when determining the total score for the slide patches according to the method of the invention.

The stained and annotated histology image is segmented in step (iv) of the method into either non-overlapping, partially overlapping or maximum overlapping patches.

In step (v) of the method, a second mask patch is generated for each of the patches obtained in step (iv). The second mask patches are binary representations of said slide patch in the form of a matrix storing information with respect to each pixel within the patch including the coordinates of the pixel relative to the original histology image, and whether the pixel is positive or negative for tissue abnormality (such as cellular abnormality), namely, whether the pixel shows an abnormal cell or any other abnormal tissue characteristic that is identified as associated with a disease or not. The determination of whether a certain pixel is positive or negative for tissue abnormality is made in reference to the annotations received in the first step of the method. Accordingly, the second mask patches are indicative of the region of tissue abnormality (e.g., cancerous regions) in the slide.

Subsequently, a second mask image of the entire image is generated by combining the binary representations of all the patches belonging to the same image into a single second mask image having the same size as the original histology image.

Afterwards, a second score is determined in step (vi) of the method for each possible patch (namely, for maximum overlapping patches) of the second mask image obtained in step (v). The second score is essentially a number indicating the area (i.e., the number of pixels) in the patch that is positive for tissue abnormality.

Similar to the first score, the second score may also serve as sub-score when determining the total score for the slide patches according to the method.

As can be appreciated, steps (i) to (iii) of the method as described above may be carried out before, after, or simultaneously with steps (iv) to (vi).

According to the method described herein, either the slide patches obtained in step (i) or the slide patches obtained in step (iv), or both, are partially overlapping or maximum overlapping slide patches. In one embodiment of the invention, only one of steps (i) and (iv) results in obtaining partially overlapping or maximum overlapping slide patches. In another embodiment, both steps (i) and (iv) result in obtaining partially overlapping slide patches, and the level of overlap can be different or identical. In yet another embodiment, both steps (i) and (iv) result in obtaining maximum overlapping slide patches. Of course, if the type of separation/segmentation in step (iv) is identical to the type of separation/segmentation in step (i), then step (iv) is redundant and can be omitted. When step (iv) is omitted, the second mask patch can be generated in step (v) for each of the patches obtained in step (i). Accordingly, step (iv) is necessary only if the overlap type of the slide patches obtained in step (iv) is different from the overlap type of the slide patches obtained in step (i). Step (iv) is also necessary if both steps (i) and (iv) result in obtaining partially overlapping slide patches, but with different levels of partial overlap.

In some embodiments of the invention, the first and/or second score is directly determined for maximum overlapping slide patches, without the need for the generation of a first/second mask image.

The maximum overlapping segmentation technique enables the significant increase of data that can be obtained from a single pathology/histology image. Therefore, in contrast to models of the prior art, the model trained by the method described herein does not require access to a large number of histology images and is therefore suitable for detecting gene mutations (or tissue abnormalities) that are relatively rare in the population or are otherwise understudied, without reducing the sensitivity and/or specificity of the model.

The method described herein encompasses an embodiment wherein the first and/or second score is directly determined for each of the maximum overlapping patches, or alternatively, the total score is directly determined for each of the maximum overlapping patches. In order to reduce that chances of system overload and make the method and system of the invention more accessible to less powerful processors, the analyses of the first and second scores can be carried out on a "simpler" form of representation of the histology image, namely a binary representation of said image that is the first and second mask images, which in turn can be generated based on more "economic" segmentations, such as non-overlapping and partially overlapping segmentations, respectively.

Thus, the method according to the present invention provides an efficient, time- and effort-saving model, in which the advantages of increased sensitivity and specificity of the model and the large amount of data that can be obtained from a single histology image due to the processing of maximum overlapping patches of the image are not hindered by the need for operating the model using supercomputers or any special resources.

In embodiments wherein first and second scores are determined, the total score is not directly determined for each of the maximum overlapping patches, but rather is based on the first and second scores obtained prior to selecting slide patches as training data. As described above, a total score is determined based on the number of tissue characteristics (e.g., the number of cells) in the patch, the type of tissue characteristic that is of increased relevance to the type of disease, disorder or pathological condition or to the gene mutation of interest (e.g., the classification of the cells), and whether the patch contains an area of tissue abnormalities (e.g., a cellular abnormality). Since the first score indicates the number of tissue characteristics and their type in the patch and the second score indicates the number of pixels positive for an abnormal tissue characteristic in the patch, the total score has essentially the same significance whether it was determined directly or based on the scores obtained in steps (iii) and (vi), such that the total score is indicative of the number of tissue characteristics in a patch, their type, and the area of tissue abnormality present in the same patch.

According to a specific embodiment of the invention, the first mask patch is generated for non-overlapping slide patches and the second mask patch is generated for partially overlapping slide patches. In other words, step (i) consists of separating each of the plurality of stained and annotated histology images into non-overlapping slide patches and step (iv) consists of separating each of the plurality of stained and annotated histology images into partially overlapping slide patches.

Figure 4:
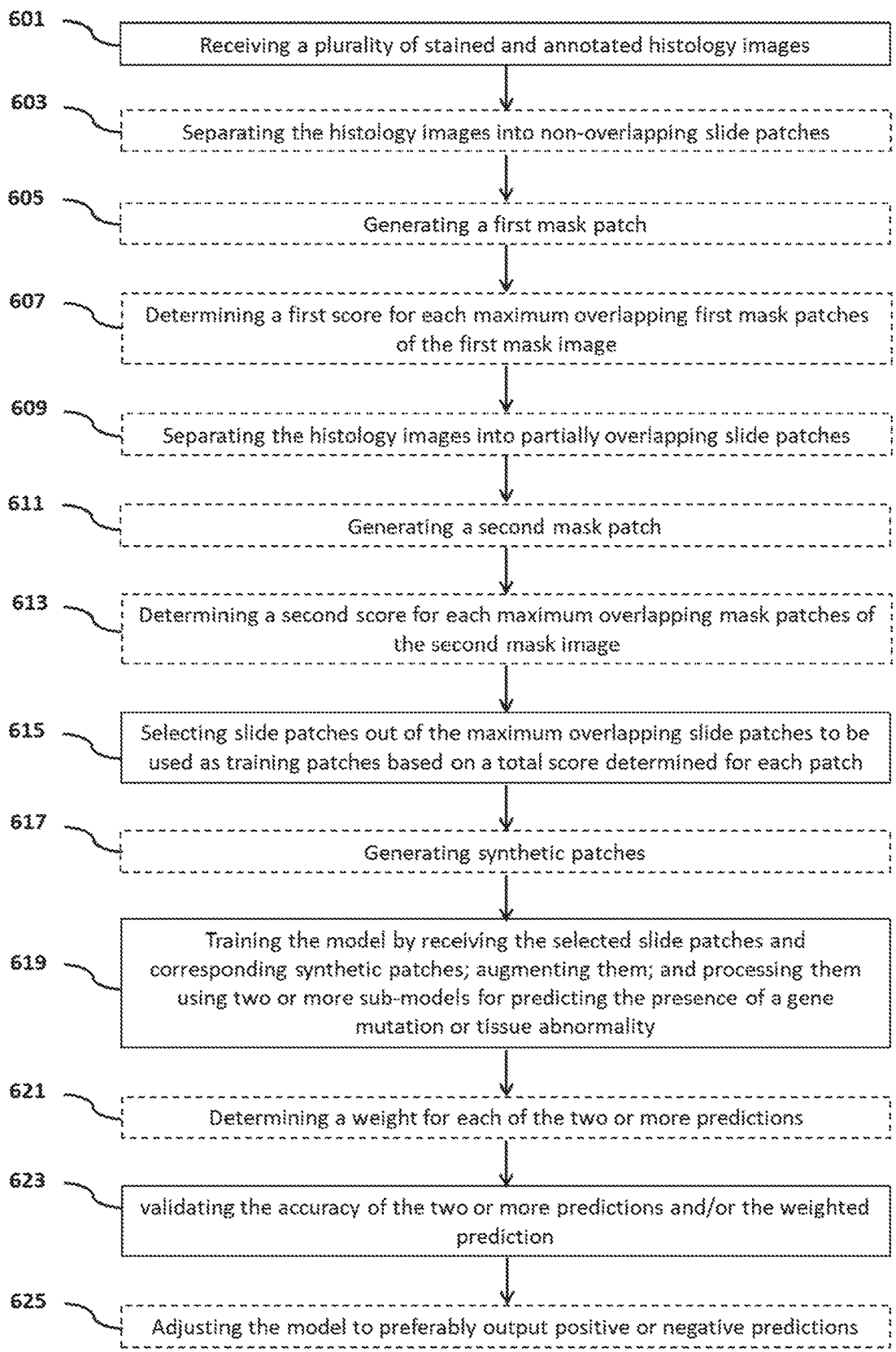
FIG. 4 shows steps in a method for training a machine learning model to detect the presence of a gene mutation or a tissue abnormality in a biopsy sample according to a specific embodiment of the invention. The steps that are shown with a dashed outline are optional.

Accordingly, a specific embodiment of the invention provides a method for training a machine learning model to detect the presence of a gene mutation or tissue abnormality in a biopsy sample as set forth in FIG. 4, the method comprising the steps of:

(A) receiving a plurality of stained and annotated histology images prepared from biopsy samples harvested from a group of patients who were diagnosed with a disease, disorder or pathological condition or who were identifies as carrying the gene mutation, wherein each of the plurality of stained and annotated histology images includes at least one annotation of a tissue characteristic in at least a portion of the image (step 601 in FIG. 4);

(B) separating each of the plurality of stained and annotated histology images into non-overlapping slide patches (step 603 in FIG. 4);

(C) generating a first mask patch for each slide patch obtained in step (B) by determining a first binary matrix to represent said slide patch, the first binary matrix indicating the presence or absence of a tissue characteristic in each pixel within the first mask patch and the type of tissue characteristic present in said pixel according to the annotations received in step (A) and the coordinates of each pixel within the image, and combining the binary representations of all the patches originating from the same image into a first mask image (step 605 in FIG. 4);

(D) determining a first score for each maximum overlapping mask patches of the first mask image, the first score being indicative of the number of pixels in each mask patch that are positive for the presence of a tissue characteristic, and the type of said tissue characteristic (step 607 in FIG. 4);

(E) separating each of the plurality of stained and annotated histology images into partially overlapping slide patches (step 609 in FIG. 4);

(F) generating a second mask patch for each slide patch obtained in step (E) by determining a binary matrix to represent the slide patch, the binary matrix indicating whether a pixel within the second mask patch is positive or negative for tissue abnormality according to the annotations received in step (A) and the coordinates of each pixel within the image, and combining the binary representations of all the patches originating from the same image into a second mask image (step 611 in FIG. 4);

(G) determining a second score for each maximum overlapping mask patches of the second mask image, the second score being indicative of the number of pixels in each mask patch that are positive for tissue abnormality (step 613 in FIG. 4);

(H) selecting slide patches out of maximum overlapping slide patches of the histology image to be used as training patches for the model based on a total score determined for each of the maximum overlapping slide patches, the total score being indicative of the relevance of the patch as a training patch based on the number of pixels in the patch that are positive for the presence of a tissue characteristic, the type of said tissue characteristic, and the number of pixels in the patch that are positive for tissue abnormality (step 615 in FIG. 4);

(I) generating synthetic patches based on the slide patches selected as training patches in step (H) (step 617 in FIG. 4);

(J) training the machine learning model by receiving the slide patches selected as training patches in step (H) and the synthetic patches generated in step (I); augmenting said selected slide patches and synthetic patches, thereby obtaining one or more corresponding augmented patches; and processing the selected slide patches, synthetic patches and augmented patches based on the annotations of the tissue characteristics included in the histology image using two or more (e.g., between 2 to 10) sub-models configured to predict the presence of a gene mutation or tissue abnormality in each of said histology images, thereby obtaining two or more, respectively, predictions, each prediction indicating a probability that a gene mutation or tissue abnormality is present in the histology image (step 619 in FIG. 4); and (K) determining a weight for each of the two or more predictions obtained in step (J), and providing a final weighted prediction (step 621 in FIG. 4); and (L) validating the accuracy of the two or more predictions and/or the weighted prediction (step 623 in FIG. 4); and (M) adjusting the trained model to preferably output positive or negative predictions (step 625 in FIG. 4).

In one embodiment of the invention, the gene mutation is a gene mutation associated with cancer. In another embodiment, the tissue abnormality is an abnormal cell. In a specific embodiment, the abnormal cell is a cancer cell.

In another embodiment of the invention, the validating the accuracy of the two or more predictions takes place prior to determining a weight.

As in the spirit of the invention, steps (B), (I) and (M) are optional, and steps (C) to (G) are carried out only when performing step (B).

The trained model can then be stored on at least one storage device to be used for predicting the presence of a gene mutation or tissue abnormality in a biopsy sample.

The machine learning model may include one or more of a support vector machine, a neural network, a convolutional neural network, a regression, a random forest, a clustering, a Bayesian network, reinforcement learning, metric learning, a genetic algorithm, or another suitable model.

Throughout this disclosure, a convolutional neural network is used as an example of a statistical model that may be used in accordance with some embodiments. However, it should be appreciated that other types of statistical models may alternatively be used, and embodiments are not limited in this respect. Other types of statistical models that may be used include a support vector machine, a neural network, a regression model, a random forest, a clustering model, a Bayesian network, reinforcement learning, metric learning, a genetic algorithm, or another suitable model.

Figure 5:
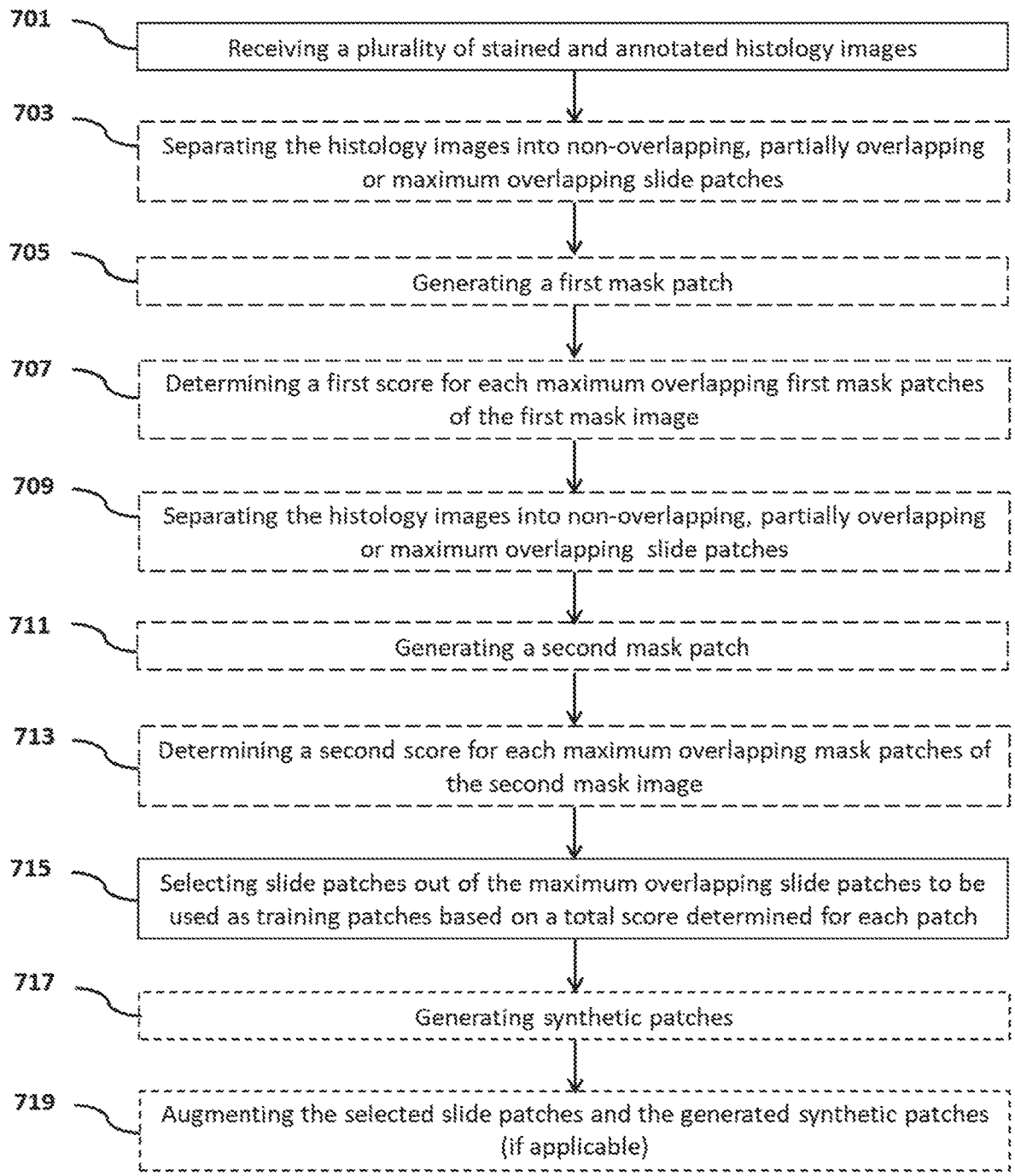
FIG. 5 shows steps in a method for increasing the amount of training data provided to a machine learning model during its training. The steps that are shown with a dashed outline are optional.

In another aspect, the present invention provides a method for increasing the amount of training data provided to a machine learning model configured to detect the presence of a gene mutation or tissue abnormality (as set forth in FIG. 5), the method comprising the steps of:

receiving a plurality of stained and annotated histology images, wherein the stained and annotated histology images are prepared from biopsy samples harvested from a group of patients who were diagnosed with a disease, disorder or pathological condition or who were detected to carry a gene mutation; and wherein each of the plurality of stained and annotated histology images includes at least one annotation of a tissue characteristic in at least a portion of the image (step 701 in FIG. 5); and selecting slide patches out of maximum overlapping slide patches of the plurality of histology images to be used as training patches for the machine learning model based on a total score determined for each of the maximum overlapping slide patches, wherein the total score is indicative of the relevance of the patch as a training patch based on the number of pixels in the patch that are positive for the presence of a tissue characteristic, the type of said tissue characteristic, and the number of pixels in the patch that are positive for tissue abnormality according to the received annotations (step 715 in FIG. 5).

According to one embodiment, prior to selecting slide patches, the method further comprises the steps of:

(i) separating each of the plurality of stained and annotated histology images into non-overlapping, partially overlapping or maximum overlapping slide patches (step 703 in FIG. 5);

(ii) generating a first mask patch for each slide patch obtained in step (i) by determining a first binary matrix to represent said slide patch, the first binary matrix indicating the presence or absence of a tissue characteristic in each pixel within the first mask patch and the type of tissue characteristic present in said pixel according to the annotations of the tissue characteristics included in the received histology image and the coordinates of each pixel within the image, and combining the binary representations of all the patches originating from the same image into a first mask image (step 705 in FIG. 5);

(iii) determining a first score for each of maximum overlapping mask patches of the first mask image, the first score being indicative of the number of pixels in each mask patch that are positive for the presence of a tissue characteristic, and the type of said tissue characteristic (step 707 in FIG. 5);

(iv) separating each of the plurality of stained and annotated histology images into non-overlapping, partially overlapping or maximum overlapping slide patches (step 709 in FIG. 5);

(v) generating a second mask patch for each slide patch obtained in step (i) by determining a binary matrix to represent the slide patch, the binary matrix indicating whether a pixel within the second mask patch is positive or negative for a tissue abnormality according to the annotations of the tissue characteristics included in the received histology image and the coordinates of each pixel within the image, and combining the binary representations of all the patches originating from the same image into a second mask image (step 711 in FIG. 5); and (vi) determining a second score for each of maximum overlapping mask patches of the second mask image, the second score being indicative of the number of pixels in each mask patch that are positive for tissue abnormality (step 713 in FIG. 5);

wherein either the slide patches obtained in step (i) or the slide patches obtained in step (iv), or both, are partially overlapping or maximum overlapping slide patches; and wherein the total score is determined based on the first and second scores.

According to a specific embodiment of the invention, step (i) consists of separating each of the plurality of stained and annotated histology images into non-overlapping slide patches and step (iv) consists of separating each of the plurality of stained and annotated histology images into partially overlapping slide patches.

In some embodiment, the method further comprises generating one or more synthetic patches based on the slide patches selected as training patches, such that the selected slide patches and the one or more generated synthetic patches are used as training data (step 717 in FIG. 5).

According to one embodiment of the invention, the method further comprising augmenting the slide patches selected as training patches and the generated synthetic patches, thereby obtaining one or more corresponding augmented patches, such that the selected slide patches, the one or more generated synthetic patches and the one or more corresponding augmented patches are used as training data (step 719 in FIG. 5).

As would be appreciated by a person of skills in the art, the steps of the method described above may be implemented to any method for training a model seeking to increase the training data obtained from a smaller amount or histology images or biopsy samples. In such case, the score that is determined for each of the maximum overlapping patches in order to enable the selection of relevant slide patches to be used as training data and for further processing is adapted to be indicative of said relevance of the slide patches.

In a further aspect, there is provided a system for training a machine learning model to detect the presence of a gene mutation or tissue abnormality in a biopsy sample, the system comprising:
  i. at least one computer hardware processor; and
  ii. at least one non-transitory computer-readable storage medium storing processor-executable instructions, that when executed by the at least one computer hardware processor, cause the at least one computer hardware processor to perform the steps of the method for training a machine learning model to detect the presence of a gene mutation or tissue abnormality in a biopsy sample as described above.

Figure 6:
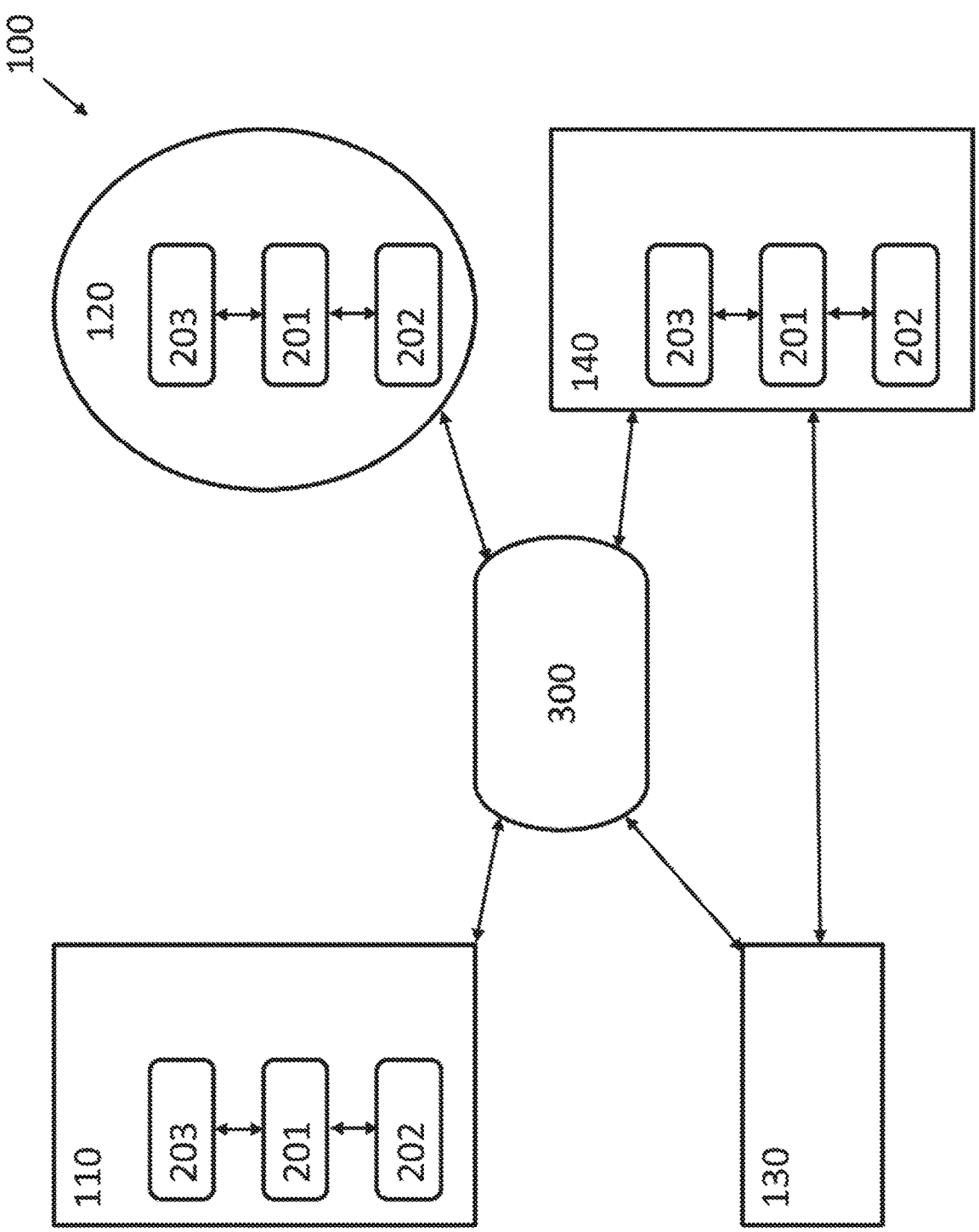
FIG. 6 shows a block diagram of a computer system on which various embodiments of the technology described herein may be practiced.

FIG. 6 shows a block diagram of a computer system on which various embodiments of the technology described herein may be practiced. The system 100 includes at least one computer 110. Optionally, the system 100 may further include one or more of a server computer 120 and an imaging instrument 130, which may be coupled to an instrument computer 140. Each computer in the system 100 may include a processor 201 coupled to a tangible, non-transitory memory device (or collection of memory devices) 202 and at least one input/output device 203. The components of the system 100 (e.g., computer, server, instrument computer, and imaging instrument) may be in communication over a network 300 that may be wired or wireless and wherein the components may be remotely located or located in close proximity to each other. Using those components, system 100 is operable to receive or obtain pathology/histology images, slide patches, and/or training data and output data (data obtained at the end of each step in the methods described above, which may be trained or otherwise operated by the processor). In certain embodiments, the system uses the memory to store the received data and the output data.

In some embodiments, some or all of system 100 is implemented in a cloud-based architecture. The cloud-based architecture may offer on-demand access to a shared pool of configurable computing resources (e.g. processors, graphics processors, memory, disk storage, network bandwidth, and other suitable resources).

The term "processor" as used herein refers to any device or system of devices that performs processing operations. A processor will generally include a chip, such as a single-core or multi-core chip (e.g., 12 cores), to provide a central processing unit (CPU). In certain embodiments, a processor may be a graphics processing unit (GPU).

Computers may include multiple processors including CPUs and or GPUs that may perform different steps of the described methods.

The term "memory device" is a mechanical device or a combination of memory devices that stores data or instructions in a machine-readable format. Memory may include one or more sets of instructions (e.g., software) which, when executed by one or more of the processors can accomplish some or all of the methods or functions described herein. Each computer may include a non-transitory memory device such as a solid-state drive, flash drive, disk drive, hard drive, subscriber identity module (SIM) card, secure digital card (SD card), micro SD card, or solid-state drive (SSD), optical and magnetic media, others, or a combination thereof.

Using the described components, system 100 is operable to produce a report containing output data and provide the report to a user via an input/output device. The term "input/output device" as used herein refers to a mechanism or system for transferring data into or out of a computer. Exemplary input/output devices include a video display unit (e.g., a liquid crystal display (LCD) or a cathode ray tube (CRT)), a printer, an alphanumeric input device (e.g., a keyboard), a cursor control device (e.g., a mouse), a disk drive unit, a speaker, a touchscreen, an accelerometer, a microphone, a cellular radio frequency antenna, and a network interface device, which can be, for example, a network interface card (NIC), Wi-Fi card, or cellular modem.

In yet a further aspect, the present invention provides a method for detecting the presence of a gene mutation or tissue abnormality in a biopsy sample, using the model trained by the methods described above, as set forth in FIG. 7, the method comprising the steps of:
  (I) receiving one or more stained histology images prepared from a biopsy sample harvested from a patient (step 801 in FIG. 7);
  (II) segmenting each of the one or more stained histology images into non-overlapping or partially overlapping slide patches (step 803 in FIG. 7);
  (III) generating a first mask patch for each slide patch obtained in step (II) by determining a first binary matrix to represent said slide patch, the first binary matrix indicating the presence or absence of a tissue characteristic (e.g., a cell) in each pixel within the first mask patch and the type of tissue characteristic (e.g., the classification of the cell) present in said pixel, and the coordinates of each pixel within the image, and combining the binary representations of all the patches originating from the same image into a first mask image (step 805 in FIG. 7);
  (IV) determining a first score for each of maximum overlapping mask patches of the first mask image, the first score being indicative of the number of pixels in each mask patch that are positive for the presence of a tissue characteristic, and the type of said tissue characteristic (step 807 in FIG. 7);
  (V) segmenting each of the one or more stained histology images into non-overlapping or partially overlapping slide patches (step 809 in FIG. 7);
  (VI) generating a second mask patch for each slide patch obtained in step (V) by determining a binary matrix to represent the slide patch, the binary matrix indicating whether a pixel within the second mask patch is positive or negative for tissue abnormality (e.g., cancer cell) and the coordinates of each pixel within the image, and combining the binary representations of all the patches originating from the same image into a second mask image (step 811 in FIG. 7);
  (VII) determining a second score for each maximum overlapping mask patches of the second mask image, the second score being indicative of the number of pixels in each mask patch that are positive for tissue abnormality (step 813 in FIG. 7);
  (VIII) selecting patches out of partially overlapping slide patches of the one or more stained histology images to be further processed by the model based on a total score determined for each patch, the total score being indicative of the relevance of the patch for further processing based on the number of pixels in the patch that are positive for the presence of a tissue characteristic, the type of said tissue characteristic, and whether the patch is positive for tissue abnormality (step 815 in FIG. 7); and (IX) processing each of the patches selected for further processing in step (VIII), using at least one sub-model configured to predict the presence of a gene mutation or tissue abnormality in each of said histology images that was trained according to the method for training a model as described above, thereby obtaining at least one (depending on the number of sub-models) prediction of the probability that a gene mutation or tissue abnormality is present in the pathology image (step 817 in FIG. 7).

Figure 7:
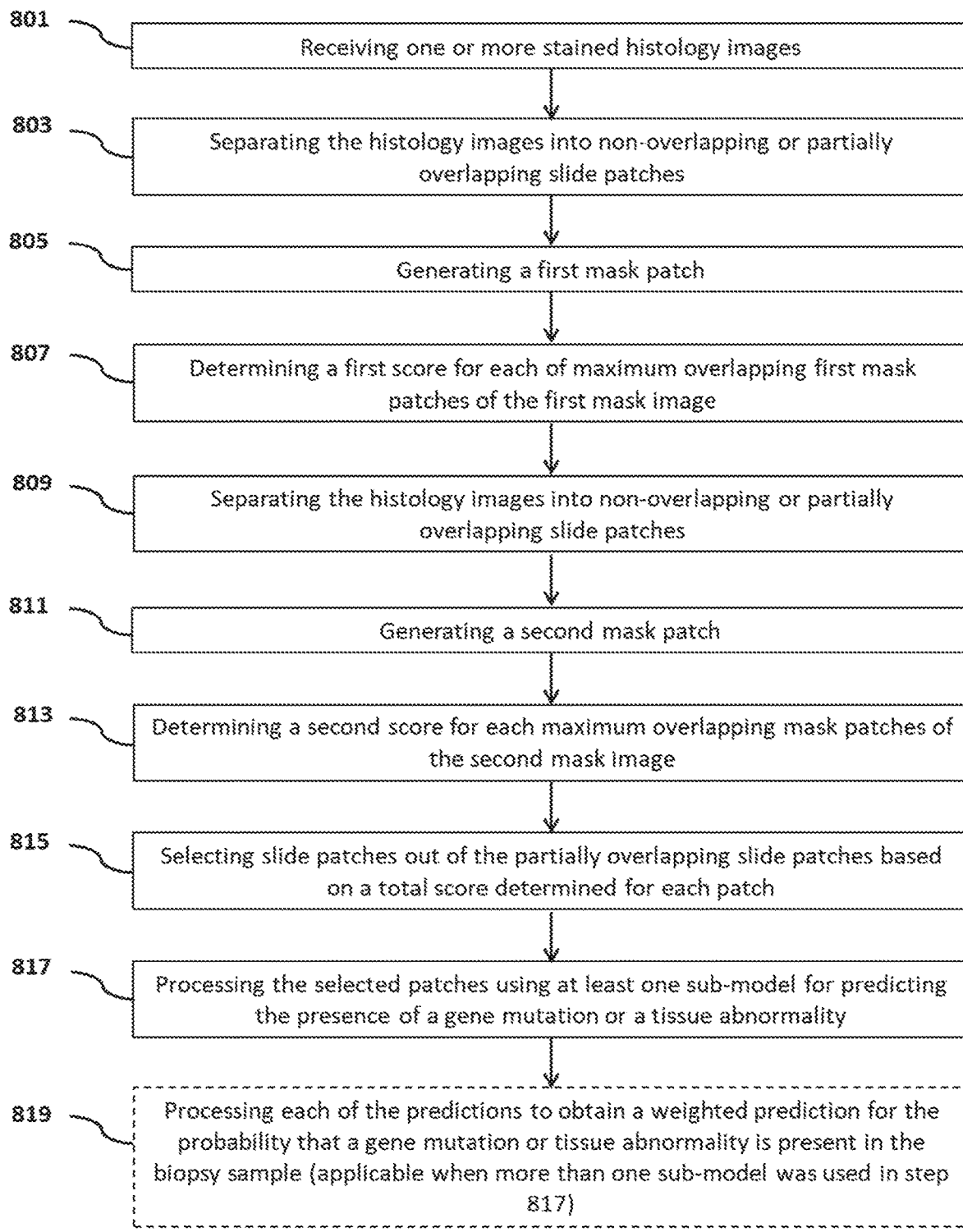
FIG. 7 shows steps in a method for detecting the presence of a gene mutation or a tissue abnormality in a biopsy sample according to a specific embodiment of the invention. The steps that are shown with a dashed outline are optional.

In an embodiment in which two or more trained sub-models are used in the processing step, the method may further comprise the step of:

(X) processing each of the predictions obtained in step (IX) according to a weight determined by the method for training a model described above for each prediction, thereby obtaining a single weighted prediction for the probability that a gene mutation or tissue abnormality is present in the biopsy sample (step 819 in FIG. 7).

Alternatively, the single final prediction may not be weighted, but is an average of the two or more predictions.

It should be noted that the single final prediction provided by the method may or may not be adjusted to output positive or negative predictions, depending on whether the sub-model(s) was trained to be adjusted according to the methods of the invention.

In one embodiment of the invention, the tissue abnormality is an abnormal cell. In a specific embodiment of the invention, the abnormal cell is a cancer cell and/or the gene mutation is a cancer-causing gene mutation.

In the method for detecting the presence of a gene mutation or tissue abnormality in a biopsy sample, using a model trained as described hereinabove, the histology images are prepared in a similar manner as the histology images received in the first step of the method for training a model, except that the histology images are stained but not annotated. Instead, annotations can be made by the model trained according to the method of the invention in order to obtain the first and the second scores for the patches in the image. Then, a total score is determined and based on said total score, a certain patch is discarded or selected for further processing.

As in the spirit of the present invention, step (II) is optional, and steps (VII) to (VII) are carried out only when performing step (II). In an embodiment where the method comprises steps (II) to (VII), the total score is determined based on the first and second scores. Otherwise, the total score is determined by directly analyzing the patch according to the number of tissue characteristics (e.g., cells) therein, their type, and the presence of a tissue abnormality (e.g., a cancer area) in the same patch.

According to a specific embodiment of the invention, step (II) consists of segmenting each of the one or more stained histology images into non-overlapping slide patches and step (V) consists of segmenting each of the one or more stained histology images into partially overlapping slide patches.

Of course, if the type of separation/segmentation in step (V) is identical to the type of separation/segmentation in step (II), then step (V) is redundant and can be omitted. When step (V) is omitted, the second mask patch can be generated in step (VI) for each of the patches obtained in step (I). Accordingly, step (V) is necessary only if the overlap type of the slide patches obtained in step (V) is different from the overlap type of the slide patches obtained in step (II). Step (V) is also necessary if both steps (II) and (V) result in obtaining partially overlapping slide patches, but with different levels of partial overlap.

In general, steps (II) and (V) may also include separating the histology images to maximum overlapping patches; however, in order to reduce the chance of system overload and for the sake of brevity, only the more "economic" segmentations (i.e., non-overlapping and partially overlapping segmentation) are mentioned above.

The selected patches are further processed by at least one (e.g., 2 to 10) sub-model, such that each slide receives one or more (depending on the number of sub-models used) distinct and independent predictions from each sub-model. When more than one prediction is obtained and a weight for each predictions is assigned in step (X), the model weighs each prediction based on its diagnostic power (determined in the training phase which is carried out according to the methods for training a model as described above), namely, its accuracy, and provides a single weighted prediction indicating the probability that a gene mutation or tissue abnormality is present in the biopsy sample that is the origin of the pathology image.

The method for detecting the presence of a gene mutation or tissue abnormality in a biopsy sample, using the model trained by the method described above may be used to assist a physician in diagnosing a disease, disorder or pathological conditions (such as a specific type of cancer) in a patient and consequently select a treatment for personalized therapy.

Of course, the detection of the gene mutation or tissue abnormality in the histology image is provided in the form of a prediction. If no adjustments were made to the predictions outputted by the sub-models, then normally a prediction of more than 0.5 indicated that the image is likely to have a gene mutation or tissue abnormality and a prediction of less than 0.5 indicates that the image is not likely to have a gene mutation or tissue abnormality.

In yet another aspect, there is provided a method for diagnosing a disease, disorder or pathological condition in a subject, the method comprising detecting the presence of a gene mutation or tissue abnormality in a biopsy sample according to the method described above and determining a positive or negative diagnosis of the disease, disorder or pathological condition, wherein a positive prediction of a gene mutation or tissue abnormality in a pathology/histology image is an indication of a positive diagnosis of the disease, disorder or pathological condition and a negative prediction of a gene mutation or tissue abnormality in a pathology image or is an indication of a negative diagnosis of the disease, disorder or pathological condition.

In one embodiment, the disease is cancer, such that the gene mutation is a gene mutation associated with cancer and the tissue abnormality is an abnormal cell in the form of a cancer cell.

In another aspect, the present invention provides a non-transitory computer-readable storage medium storing processor-executable instructions that, when executed by at least one processor, cause the at least one processor to perform steps of the methods for training a model described herein and/or the steps of the method for detecting the presence of a gene mutation or tissue abnormality in a biopsy sample described above.

Optionally, the storage medium is provided in a computer.

The invention will now be described with reference to specific examples and materials. The following examples are representative of techniques employed by the inventors in carrying out aspects of the present invention. It should be appreciated that while these techniques are exemplary of specific embodiments for the practice of the invention, those of skill in the art, in light of the present disclosure, will recognize that numerous modifications can be made without departing from the spirit and intended scope of the invention.

EXAMPLES

Example 1

Detection of RET Fusion Alteration Using a Trained Model

Biopsy samples were obtained from patients diagnosed as carrying the RET fusion gene alterations. The biopsy samples harvested from the thyroid of these subjects were fixed with formalin and embedded in paraffin (FFPE treated) and then sectioned and stained with H&E. The stained slides were scanned and the scans were magnified and annotated. The model was trained to detect RET fusion alteration by a method comprising steps 601, 603, 605, 607, 609, 611, 613, 615, 617, 619, and 621 as shown in FIG. 4 and described above. Specifically, 6 different sub-models were used to output a prediction according to the method. Then, 102 histology images were used for testing the accuracy of the model according to step 623 in FIG. 4. 97 of those 102 images were negative for RET fusion alteration, while 5 were positive for the fusion.

Testing the accuracy of the model revealed a sensitivity value of 100%. Namely, all the images representing subjects carrying the mutation indeed received a positive prediction by the model. Moreover, the model trained by the method of the invention had 95.7% specificity, namely, 95.7% of the predictions were true negative.

Example 2

Detection of BRAF Mutation Alteration Using a Trained Model

Biopsy samples were obtained from patients diagnosed as carrying the BRAF mutation gene alterations. The biopsy samples were harvested from the thyroid of these subjects, FFPE treated, sectioned, and stained with H&E. The stained slides were scanned, and the scans were magnified and annotated. The model was trained to detect BRAF mutation alteration by the same method described in Example 1. 102 histology images were used for testing the accuracy of the model. 48 of those 102 images were negative for BRAF mutation alteration, while 54 were positive for the mutation.

Testing the accuracy of the model revealed a sensitivity value of 91.7%. Namely, 91.7% of the images representing subjects carrying the mutation indeed received a positive prediction by the model. Moreover, the model trained by the method of the invention had 90.7% specificity, namely, 90.7% of the predictions were true negative.

Example 3

Detection of NTRK Fusion Alteration Using a Trained Model

Biopsy samples were obtained from patients diagnosed as carrying the NTRK fusion gene alterations. The biopsy samples were harvested from the thyroid of these subjects, FFPE treated, sectioned, and stained with H&E. The stained slides were scanned, and the scans were magnified and annotated. The model was trained to detect NTRK fusion alteration by the same method described in Example 1. 102 histology images were used for testing the accuracy of the model. 99 of those 102 images were negative for NTRK fusion alteration, while 3 were positive for the fusion.

Testing the accuracy of the model revealed a sensitivity value of 100% and specificity value of 93.9%.

Example 4

Detection of ALK Fusion Alteration Using a Trained Model

Biopsy samples were obtained from patients diagnosed as carrying the ALK fusion gene alterations. The biopsy samples were harvested from the lung of these subjects, FFPE treated, sectioned, and stained with H&E. The stained slides were scanned, and the scans were magnified and annotated. The model was trained to detect ALK fusion alteration by the same method described in Example 1. 72 histology images were used for testing the accuracy of the model. 67 of those 72 images were negative for ALK fusion alteration, while 5 were positive for the fusion.

Testing the accuracy of the model revealed a sensitivity value of 100% and specificity value of 100%. Namely, all the images representing subjects carrying the fusion indeed received a positive prediction by the model and all of the negative predictions were indeed true negative.

Example 5

Detection of KRAS Mutation Alteration Using a Trained Model

Biopsy samples were obtained from patients diagnosed as carrying the KRAS mutation gene alterations. The biopsy samples were harvested from the lung of these subjects, FFPE treated, sectioned, and stained with H&E. The stained slides were scanned, and the scans were magnified and annotated. The model was trained to detect KRAS mutation alteration by the same method described in Example 1. 104 histology images were used for testing the accuracy of the model. 94 of those 104 images were negative for KRAS mutation alteration, while 10 were positive for the mutation.

Testing the accuracy of the model revealed a sensitivity value of 100% and specificity value of 88.3%.

Example 6

Detection of HER2 Overexpression Using a Trained Model

Biopsy samples were obtained from patients diagnosed as carrying the HER2 overexpression gene alterations. The biopsy samples were harvested from the breast of these subjects, FFPE treated, sectioned, and stained with H&E. The stained slides were scanned and the scans were magnified and annotated. The model was trained to detect HER2 overexpression by the same method described in Example 1. 45 histology images were used for testing the accuracy of the model. 37 of those 45 images were negative for HER2 overexpression alteration, while 8 were positive for the overexpression.

Testing the accuracy of the model revealed a sensitivity value of 87.5% and a specificity value of 94.4%.

The invention claimed is:

1. A method for training a machine learning model to detect the presence of a gene mutation or a tissue abnormality in a biopsy sample, the method comprising the steps of:
receiving a plurality of stained and annotated histology images, wherein each of the plurality of stained and annotated histology images includes at least one annotation of a tissue characteristic in at least a portion of the image;
selecting slide patches out of maximum overlapping slide patches of each of the plurality of histology images to be used as training patches for the machine learning model based on a first total score determined for each of the maximum overlapping slide patches, wherein the first total score is indicative of the relevance of the patch as a training patch based on the number of pixels in the patch that are positive for the presence of the tissue characteristic, the type of said tissue characteristic, and the number of pixels in the patch that are positive for the tissue abnormality according to the received annotations;
training the machine learning model by receiving the slide patches selected as training patches; and processing the selected slide patches, based on the annotations of the tissue characteristics included in the plurality of stained and annotated histology images using one or more sub-models configured to predict the presence of the gene mutation or the tissue abnormality in each of the plurality of stained and annotated histology images, thereby obtaining one or more predictions, respectively, each prediction indicating a probability that the gene mutation or the tissue abnormality is present in any of the plurality of stained and annotated histology images; and
validating the accuracy of the one or more predictions.

2. The method according to claim 1, wherein prior to the training the machine learning model the method further comprises generating one or more synthetic patches based on the slide patches selected as training patches; and wherein the training the machine learning model includes receiving both the selected slide patches and the one or more generated synthetic patches and processing both the selected slide patches and the one or more generated synthetic patches.

3. The method according to claim 2, wherein the training the machine learning model further comprises, after receiving both the selected slide patches and the one or more generated synthetic patches, augmenting the received patches, thereby obtaining one or more corresponding augmented patches; and wherein the processing includes processing said received patches and their one or more corresponding augmented patches.

4. The method according to claim 1, wherein the training the machine learning model further comprises, after receiving the slide patches selected as training patches, augmenting the received patches, thereby obtaining one or more corresponding augmented patches; and wherein the processing includes processing said received patches and their one or more corresponding augmented patches.

5. The method according to claim 1, wherein the plurality of stained and annotated histology images are prepared from biopsy samples harvested from a group of patients who were diagnosed with a disease, disorder or pathological condition or who were detected to carry the gene mutation.

6. The method according to claim 1, wherein the processing involves using two or more sub-models configured to predict the presence of the gene mutation or the tissue abnormality in each of said histology images, thereby obtaining two or more predictions, respectively, each prediction indicating a probability that the gene mutation or the tissue abnormality is present in any of the histology images.

7. The method according to claim 6, wherein the processing involves using between 2 to 10 sub-models configured to predict the presence of the gene mutation or the tissue abnormality in each of said histology images, thereby obtaining between 2 to 10 predictions, respectively, each prediction indicating a probability that the gene mutation or the tissue abnormality is present in any of the histology images.

8. The method according to claim 6, wherein the method further comprises determining a weight for each of the obtained predictions and providing a final weighted prediction indicating a probability that the gene mutation or the tissue abnormality is present in any of the histology images.

9. The method according to claim 1, further comprising adjusting the predictions obtained by the machine learning model to be preferably positive predictions or negative predictions.

10. The method according to claim 1, wherein prior to selecting slide patches, the method further comprises the steps of:
(i) separating each of the plurality of stained and annotated histology images into a first set of slide patches being either non-overlapping slide patches, partially overlapping slide patches or maximum overlapping slide patches;
(ii) generating a first mask patch for each slide patch of the first set of slide patches obtained in step (i) by determining a first binary matrix of a first set of binary representations of each slide patch of the first set of slide patches, the first binary matrix indicating the presence or absence of the tissue characteristic in each pixel within the first mask patch and the type of the tissue characteristic present in said pixel according to the annotations of the tissue characteristics included in the received plurality of stained and annotated histology images and the coordinates of each pixel within the image, and combining the first set of binary representations of all the slide patches originating from the same histology image into a first mask image;
(iii) determining a first score for each of maximum overlapping mask patches of the first mask image, the first score being indicative of the number of pixels in each mask patch of the maximum overlapping mask patches that are positive for the presence of the tissue characteristic, and the type of said tissue characteristic;
(iv) separating each of the plurality of stained and annotated histology images into a second set of slide patches being either non-overlapping slide patches, partially overlapping slide patches or maximum overlapping slide patches;
(v) generating a second mask patch for each slide patch of the second set of slide patches obtained in step (iv) by determining a second binary matrix of a second set of binary representations of each slide patch of the second set of slide patches, the second binary matrix indicating whether a pixel within the second mask patch is positive or negative for the tissue abnormality according to the annotations of the tissue characteristics included in the received plurality of stained and annotated histology images and the coordinates of each pixel within the image, and combining the second set of binary representations of all the slide patches originating from the same histology image into a second mask image; and (vi) determining a second score for each of maximum overlapping mask patches of the second mask image, the second score being indicative of the number of pixels in each mask patch of the maximum overlapping mask patches that are positive for the tissue abnormality;

wherein the first set of slide patches and the second set of slide patches are not both non-overlapping slide patches; and wherein the first total score is determined based on the first and second scores.

11. The method according to claim 10, wherein the first set of slide patches are non-overlapping slide patches and the second set of slide patches are partially overlapping slide patches.

12. The method according to claim 1, wherein the method comprises the steps of:

(a) receiving the plurality of stained and annotated histology images prepared from biopsy samples harvested from a group of patients who were diagnosed with a disease, disorder or pathological condition or who were detected to carry the gene mutation, wherein each of the plurality of stained annotated histology images includes said at least one annotation of the tissue characteristic in at least a portion of the image;

(b) separating each of the plurality of stained and annotated histology images into a first set of slide patches being non-overlapping slide patches;

(c) generating a first mask patch for each slide patch of the first set of slide patches obtained in step (b) by determining a first binary matrix of a first set of binary representations of each slide patch of the first set of slide patches, the first binary matrix indicating the presence or absence of the tissue characteristic in each pixel within the first mask patch and the type of the tissue characteristic present in said pixel according to the annotations of the tissue characteristics included in the plurality of stained and annotated histology images received in step (a) and the coordinates of each pixel within the image, and combining the first set of binary representations of all the slide patches originating from the same histology image into a first mask image;

(d) determining a first score for each of maximum overlapping mask patches of the first mask image, the first score being indicative of the number of pixels in each mask patch of the maximum overlapping mask patches that are positive for the presence of the tissue characteristic, and the type of said tissue characteristic;

(e) separating each of the plurality of stained and annotated histology images into a second set of slide patches being partially overlapping slide patches;

(f) generating a second mask patch for each slide patch of the second set of slide patches obtained in step (e) by determining a second binary matrix of a first set of binary representations of each slide patch of the second set of slide patches, the second binary matrix indicating whether a pixel within the second mask patch is positive or negative for the tissue abnormality according to the annotations of the tissue characteristics included in the plurality of stained and annotated histology images received in step (a) and the coordinates of each pixel within the image, and combining the second set of binary representations of all the slide patches originating from the same histology image into a second mask image;

(g) determining a second score for each maximum overlapping mask patches of the second mask image, the second score being indicative of the number of pixels in each mask patch of the maximum overlapping mask patches that are positive for tissue abnormality;

(h) selecting the slide patches out of the maximum overlapping slide patches of the plurality of histology images to be used as the training patches for the machine learning model based on the first total score determined for each of the maximum overlapping slide patches;

(i) generating one or more synthetic patches based on the slide patches selected as the training patches in step (h);

(j) training the machine learning model by receiving the slide patches selected as the training patches in step (h) and the one or more synthetic patches generated in step (i); optionally augmenting said selected slide patches and synthetic patches, thereby obtaining one or more corresponding augmented patches; and processing the selected slides patches, synthetic patches and augmented patches based on the annotations of the tissue characteristics included in the histology images using two or more of the sub-models configured to predict the presence of the gene mutation or the tissue abnormality in each of the plurality of stained and annotated histology images, thereby obtaining two or more of the respective predictions, each prediction indicating the probability that the gene mutation or the tissue abnormality is present in any of the plurality of stained and annotated histology images;

(k) determining a weight for each of the predictions obtained in step (j) and providing a final weighted prediction indicating the probability that the gene mutation or the tissue abnormality is present in any of the plurality of stained and annotated histology images;

(l) validating the accuracy of the two or more predictions and/or of the final weighted prediction; and (m) adjusting the predictions obtained by the machine learning model to preferably positive predictions or negative predictions;

wherein steps (b), (i) and (m) are optional, and wherein steps (c) to (g) are carried out only when performing step (b).

13. The method according to claim 1, wherein the tissue characteristic is a cell and the tissue abnormality is an abnormal cell.

14. The method according to claim 13, wherein the abnormal cell is a cancer cell.

15. The method according to claim 1, wherein the gene mutation is selected from gene fusion, gene overexpression, genes underexpression, genomic deletion, and post-translational modification.

16. The method according to claim 1, wherein the gene mutation is a gene mutation associated with cancer.

17. The method according to claim 1, wherein the gene mutation is in a gene selected from TP53, BRCA, BRAF, KRAS, MET tyrosine kinase receptor, HER2/ERBB2, ALK, NTRK, ROSI and RET.

18. A method for detecting the presence of the gene mutation or the tissue abnormality in the biopsy sample, using the machine learning model trained by the method according to claim 1, the method comprising the steps of:

(I) receiving one or more stained histology images prepared from the biopsy sample harvested from a patient in need of diagnosis;

(II) segmenting each of the one or more stained histology images into a third set of non-overlapping or partially overlapping slide patches;

(III) generating a third mask patch for each slide patch of the third set of slide patches obtained in step (II) by determining a third binary matrix of a third set of binary representations of each slide patch of the third set of slide patches using the trained model, the third binary matrix indicating the presence or absence of the tissue characteristic in each pixel within the third mask patch and the type of the tissue characteristic present in said pixel, and the coordinates of each pixel within the image, and combining the third set of binary representations of all the slide patches originating from the same histology image into a third mask image;

(IV) determining a third score for each of maximum overlapping mask patches of the third mask image, the third score being indicative of the number of pixels in each mask patch of the maximum overlapping mask patches that are positive for the presence of the tissue characteristic, and the type of said tissue characteristic;

(V) segmenting each of the one or more stained histology images into a fourth set of non-overlapping or partially overlapping slide patches;

(VI) generating a fourth mask patch for each slide patch of the fourth set of slide patches obtained in step (V) by determining a fourth binary matrix of a fourth set of binary representations of each slide patch of the fourth set of slide patches using the trained model, the fourth binary matrix indicating whether a pixel within the fourth mask patch is positive or negative for the tissue abnormality and the coordinates of each pixel within the image, and combining the fourth set of binary representations of all the slide patches originating from the same histology image into a fourth mask image;

(VII) determining a fourth score for each of maximum overlapping mask patches of the fourth mask image, the fourth score being indicative of the number of pixels in each mask patch of the maximum overlapping mask patches that are positive for the tissue abnormality;

(VIII) selecting patches out of a fifth set of partially overlapping slide patches of the one or more stained histology images to be further processed by the trained machine learning model based on a second total score determined for each slide patch of the fifth set of slide patches, the second total score being indicative of the relevance of the patch for further processing based on the number of pixels in the patch that are positive for the presence of the tissue characteristic, the type of said tissue characteristic, and whether the patch is positive for the tissue abnormality; and (IX) processing each slide patch of the fifth set of slide patches selected for further processing in step (VIII), using the one or more submodels configured to predict the presence of the gene mutation or the tissue abnormality in each of said stained histology images, thereby obtaining one or more predictions, respectively, indicating the probability that the gene mutation or the tissue abnormality is present in the one or more stained histology images.

19. The method according to claim 18, wherein the processing comprises using two or more of the sub-models configured to predict the presence of the gene mutation or the tissue abnormality in each of said stained histology images; and wherein the method further comprises the step of:

(X) processing each of the one or more predictions obtained in step (IX) according to the weight determined by the machine learning model, the one or more predictions being positive or negative predictions, the machine learning model trained according to the method wherein the model is adjusted to preferably output positive or negative predictions, and providing a single weighted prediction for the probability that the gene mutation or the tissue abnormality is present in the biopsy sample.

20. The method according to claim 18, wherein step (II) consists of segmenting each of the one or more stained histology images into non-overlapping slide patches and step (V) consists of segmenting each of the one or more stained histology images into partially overlapping slide patches.

21. A method for diagnosing a disease, disorder or pathological condition in a subject, comprising:
   a. detecting the presence of the gene mutation or the tissue abnormality in the biopsy sample harvested from the subject according to the method of claim 18, and
   b. determining a positive or negative diagnosis of the disease, disorder or pathological condition, wherein if the presence of the gene mutation or the tissue abnormality was detected, a positive diagnosis of the disease, disorder or pathological condition is determined, and wherein if the presence of the gene mutation or the tissue abnormality was not detected, a negative diagnosis of the disease, disorder or pathological condition is determined.

22. A system comprising:
   i. at least one computer hardware processor; and
   ii. at least one non-transitory computer-readable storage medium storing processor-executable instructions, that when executed by the at least one computer hardware processor, cause the at least one computer hardware processor to perform the method of claim 1.

23. A non-transitory computer-readable storage medium storing processor-executable instructions that, when executed by at least one processor, cause the at least one processor to perform the steps of the method according to claim 1.

24. A method for increasing the amount of training data provided to a machine learning model configured to detect the presence of a gene mutation or tissue abnormality, the method comprising the steps of:
   receiving a plurality of stained and annotated histology images, wherein the stained and annotated histology images are prepared from biopsy samples harvested from a group of patients who were diagnosed with a disease, disorder or pathological condition or who were detected to carry the gene mutation or the tissue abnormality, and wherein each of the plurality of stained and annotated histology images includes at least one annotation of a tissue characteristic in at least a portion of the image; and
   selecting slide patches out of maximum overlapping slide patches of the plurality of stained and annotated histology images to be used as training patches for the machine learning model based on a total score determined for each of the maximum overlapping slide patches, wherein the total score is indicative of the relevance of the patch as a training patch based on the number of pixels in the patch that are positive for the presence of the tissue characteristic, the type of said tissue characteristic, and the number of pixels in the patch that are positive for the tissue abnormality according to the received annotations;
wherein prior to selecting slide patches, the method further comprises the steps of:

(i) separating each of the plurality of stained and annotated histology images into a first set of slide patches being either non-overlapping slide patches, partially overlapping slide patches or maximum overlapping slide patches;

(ii) generating a first mask patch for each slide patch of the first set of slide patches obtained in step (i) by determining a first binary matrix of a first set of binary representations of each slide patch of the first set of slide patches, the first binary matrix indicating the presence or absence of the tissue characteristic in each pixel within the first mask patch and the type of the tissue characteristic present in said pixel according to the annotations of the tissue characteristics included in the received plurality of stained and annotated histology images and the coordinates of each pixel within the image, and combining the first set of binary representations of all the slide patches originating from the same histology image into a first mask image;

(iii) determining a first score for each of maximum overlapping mask patches of the first mask image, the first score being indicative of the number of pixels in each mask patch of the maximum overlapping mask patches that are positive for the presence of the tissue characteristic, and the type of said tissue characteristic;

(iv) separating each of the plurality of stained and annotated histology images into a second set of slide patches being either non-overlapping slide patches, partially overlapping slide patches or maximum overlapping slide patches;

(v) generating a second mask patch for each slide patch of the second set of slide patches obtained in step (iv) by determining a second binary matrix of a second set of binary representations of each slide patch of the second set of slide patches, the second binary matrix indicating whether a pixel within the second mask patch is positive or negative for the tissue abnormality according to the annotations of the tissue characteristics included in the received plurality of stained and annotated histology images and the coordinates of each pixel within the image, and combining the second set of binary representations of all the slide patches originating from the same histology image into a second mask image; and (vi) determining a second score for each of maximum overlapping mask patches of the second mask image, the second score being indicative of the number of pixels in each mask patch of the maximum overlapping mask patches that are positive for the tissue abnormality;

wherein the first set of slide patches and the second set of slide patches are not both non-overlapping slide patches; and wherein the total score is determined based on the first and second scores.

25. The method of claim 24, wherein step (i) consists of separating each of the plurality of stained and annotated histology images into non-overlapping slide patches and step (iv) consists of separating each of the plurality of stained and annotated histology images into partially overlapping slide patches.

26. The method of claim 24, wherein the method further comprises generating one or more synthetic patches based on the slide patches selected as training patches, such that the selected slide patches and the one or more generated synthetic patches are used as training data.

27. The method according to claim 24, wherein the method further comprising augmenting the slide patches selected as training patches and the generated synthetic patches, thereby obtaining one or more corresponding augmented patches, such that the selected slide patches, the one or more generated synthetic patches and the one or more corresponding augmented patches are used as training data.

* * * * *